May 21, 1968 S. H. COSTON 3,384,717

CORDLESS DISPATCH TELEPHONE SWITCHING SYSTEM
HAVING CONFERENCING MEANS

Filed Aug. 3, 1964 20 Sheets-Sheet 1

INVENTOR
S. H. COSTON
BY James W. Falk
ATTORNEY

May 21, 1968 S. H. COSTON 3,384,717

CORDLESS DISPATCH TELEPHONE SWITCHING SYSTEM HAVING CONFERENCING MEANS

Filed Aug. 3, 1964 20 Sheets-Sheet 3

May 21, 1968 S. H. COSTON 3,384,717

CORDLESS DISPATCH TELEPHONE SWITCHING SYSTEM
HAVING CONFERENCING MEANS

Filed Aug. 3, 1964 20 Sheets-Sheet 4

May 21, 1968 S. H. COSTON 3,384,717

CORDLESS DISPATCH TELEPHONE SWITCHING SYSTEM HAVING CONFERENCING MEANS

Filed Aug. 3, 1964 20 Sheets-Sheet 6

LINE AND POSITION CONNECTOR CIRCUIT 102

May 21, 1968 S. H. COSTON 3,384,717

CORDLESS DISPATCH TELEPHONE SWITCHING SYSTEM
HAVING CONFERENCING MEANS

Filed Aug. 3, 1964 20 Sheets-Sheet 10

May 21, 1968 S. H. COSTON 3,384,717

CORDLESS DISPATCH TELEPHONE SWITCHING SYSTEM
HAVING CONFERENCING MEANS

Filed Aug. 3, 1964 20 Sheets-Sheet 19

United States Patent Office 3,384,717

Patented May 21, 1968

3,384,717

CORDLESS DISPATCH TELEPHONE SWITCHING SYSTEM HAVING CONFERENCING MEANS

Semer H. Coston, Denver, Colo., assignor to American Telephone and Telegraph Company, New York, N.Y., a corporation of New York Filed Aug. 3, 1964, Ser. No. 387,064
20 Claims. (Cl. 179—27)

ABSTRACT OF THE DISCLOSURE

In a cordless dispatch telephone switching system each console is equipped with a pushbutton signaling set and a plurality of trunk status indicating lamps positionally arranged in a numerically ordered matrix. Interconnection of a pair of trunks, conferencing of a group of trunks, recall of one or more trunks, and addition of other trunks to an existing conference is accomplished by the operation of a single key preceded by pushbutton generation of the unique trunk code manifested by the matrix location of the associated trunk lamps.

Figures 1, 23, 24, 25:
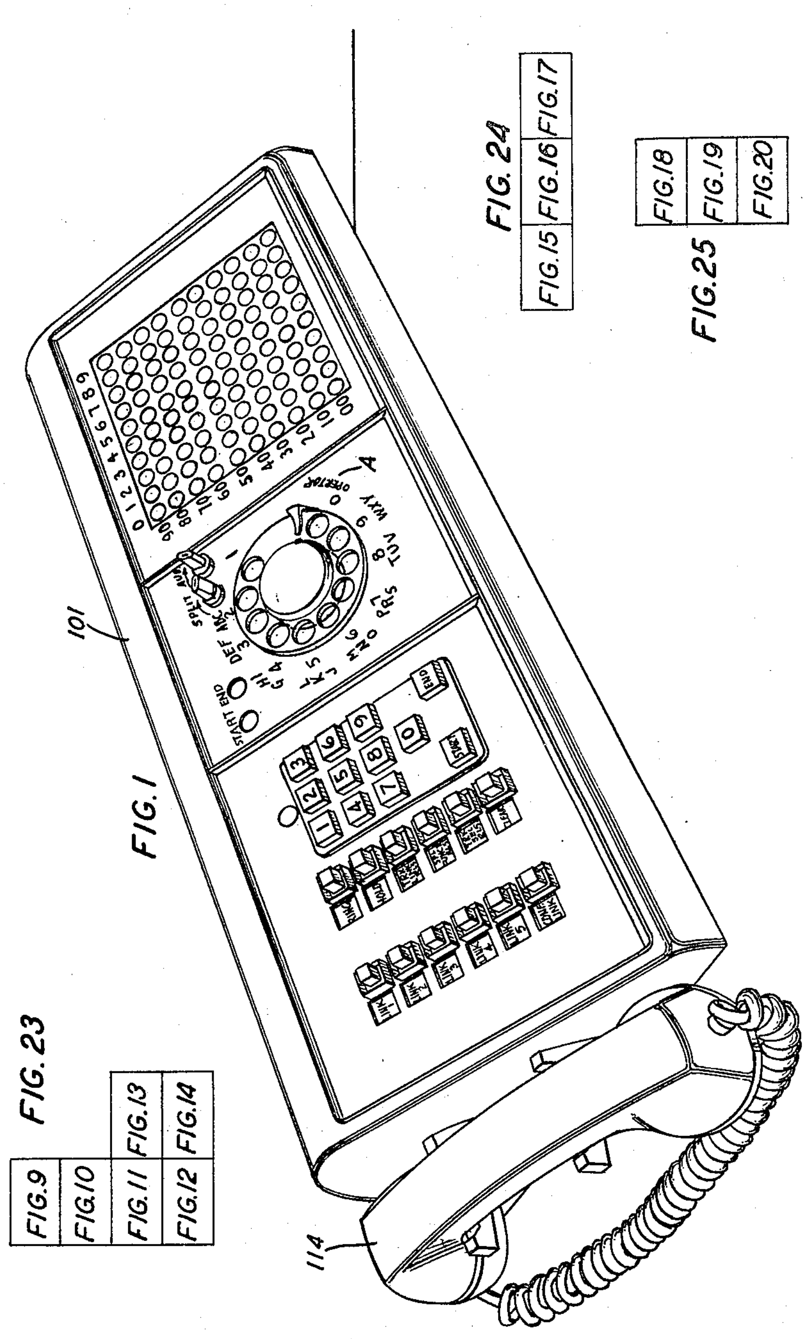
Figure 21:
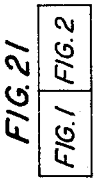
Figure 22:
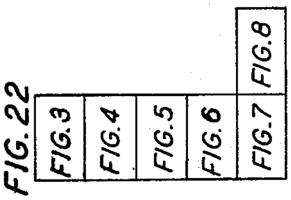

This invention relates generally to automatic switching systems and particularly to cordless telephone dispatch switching systems. More particularly, this invention relates to a key type switching system controlled from one or more console positions each equipped with a pushbutton signaling set and a plurality of status indicating trunk lamps wherein the selection and interconnection of trunk circuits is accomplished by pushbutton signaling.

Key controlled switching systems are provided where the purpose which they serve dictates the requirements of high speed, maximum flexibility, and reasonable economy. Thus today, for dispatch switching systems, a relatively small console equipped with keys and lamps replaces the comparatively large, cord controlled switchboard of prior years with an attendant increase in speed and economy, but without sacrifice of flexibility.

Such dispatch switching systems are typically provided for telephone customers, such as utility companies, whose business requires control of a large group of diversified but related service personnel. For example, a company providing electric service must be able to coordinate the activities of its commercial, engineering, and construction forces during the normal business day with respect to new requests for service, correction of routine troubles, and construction of new plant. Such dispatch switching systems are also required to be sufficiently flexible so as to provide highly efficient dispatch facilities during increased traffic induced by disaster, such as hurricanes, snow storms, and other similar occurrences.

A deficiency of existing key controlled dispatch systems is that as the number of lines or trunks increase, the respective provision of an associated designation strip, key, and lamp per trunk correspondingly increases the console's space requirements thereby significantly adding to the size of the console. It is obvious that where a large number of lines or trunks are involved, the complexity and size of the field of lamps and keys at the console diminish the efficiency of the entire system. Thus, for example, this deficiency becomes particularly significant at large installations during periods of disaster as hereinbefore set forth.

Accordingly, it is an object of this invention to provide a key controlled console for a dispatch switching system which is simpler in construction and more efficient in operation than has heretofore been provided.

It is a further object of this invention to maintain the advantages of a key controlled console for dispatch switching systems while decreasing the proportional increase of console size which normally attends an increase in the number of lines controlled therefrom.

Inasmuch as the main function of the console attendant, simply stated, is to connect the console to lines or to cause the interconnection of calling and called lines, any reduction in the required activity of the attendant to accomplish this end will result in a more efficient and economical system.

It is, therefore, also an object of this invention to reduce to an absolute minimum the operations required of the console attendant in order to establish a connection between calling and called parties.

During periods of disaster the function of the dispatch attendant becomes primarily executive in nature, since coordination of the activities of all parties in such instances is accomplished only through the dispatcher's knowledge of the entire situation as elicited from these parties. It, therefore, becomes necessary for the dispatcher to assign priorities to the completion of calls from certain lines to certain other lines in keeping with their immediate importance. However, such lines are often controlled from remotely located telephone stations via an intermediate central office. The ability of the calling party to repeat the connection from such stations may be seriously hampered by overload conditions which frequently occur at such central offices during periods of natural disaster. Accordingly, a need exists for a key controlled dispatch switching system which is operable to selectively place a plurality of incoming and outgoing trunks in a stand-by condition with subsequent ability to recall such trunks for call completion in an arbitrarily determined order.

It is, therefore, a further object of this invention to provide an arrangement which permits the fulfillment of the immediately foregoing need in a simple and expeditious manner.

During the course of day-to-day business activity and particularly during periods of disaster, the ability to establish conference connections in a rapid and efficient manner is a standard requirement of key controlled dispatch systems. Where the number of conferees is large, the ability of the console attendant to alert each respective conferee privately is desirable. However, where the number of conferees is minimal, such privacy is frequently unnecessary and in some instances may be disadvantageous.

Accordingly, it is an object of this invention to provide a conference arrangement controlled by a console attendant whereby the attendant may selectively control the privacy of communications between the attendant and the prospective conferees in an exceedingly simple and reliable manner.

These and other objects of the invention are attained in accordance with an exemplary embodiment wherein a crossbar switching network is controlled from an attendant console equipped with a pushbutton code signaling set functionally equivalent to the familiar dial, and a plurality of status indicating trunk lamps positionally arranged as a numericaly ordered matrix. A plurality of trunks leading to PBX stations and/or central offices are provided, each exclusively associated with a crossbar switch vertical in the network and a preassigned lamp at the console.

Voice connections between the console and a particular trunk are effected by control means enabled in response to the selective operation of the console pushbutton set so as to cause generation of the numerical code corresponding to the coordinate location of the particular trunk lamp at the console.

A plurality of nonlocking link keys are provided at the console. In response to the operation of a link key, the control means enable select magnets in the network exclusively associated with the link, followed by the operation of the hold magnets associated with previously selected trunks so as to cause completion of a connection between the selected trunks. Concurrently therewith, the control means disables the connection priorly existing between the console and the selected trunks, thus rendering the console free to establish additional connections.

Upon selecting a trunk for the purpose of an incoming connection to the console or for the purpose of an outgoing connection from the console, the console hold feature may be utilized. A nonlocking key at the console designated "HOLD" may be operated followed by transmission of the code of the trunk to be held via the pushbutton set. In response thereto, control means are enabled to cause completion of a bridge holding path in the trunk and the insertion of an artificial idle condition on the trunk busy test lead so as to permit recall of the connection by the console as hereinbefore described for trunk selection. In this fashion a plurality of trunks may be placed in a hold condition disassociated from the console, but with each trunk individually subject to recall.

By proceeding as hereinbefore set forth for trunk selection, a conference connection may be established. Upon operation of a conference link key, a plurality of select magnets, each associated with an independent input path to conference apparatus, are sequentially enabled so as to activate independent crosspoints, thus connecting each conferee by an independent voice path to the conference apparatus. Prior to, or while establishing the conference connection, the attendant may, by operating a locking key designated "SPLIT," enable the control means to disassociate the console voice connection from all but the most recently selected trunk. Restoration of the split key automatically causes restoration of the voice connection between the console and all priorly selected trunks.

In accordance with one feature of my invention, a dispatch switching system is provided with a console equipped with a pushbutton dial and a plurality of status indicating trunk lamps positionally arranged as a numerically ordered matrix wherein the console is operable to enable control means to cause the selection of a calling and called trunk circuit by manipulation of a pushbutton set, followed by subsequent interconnection of the trunks and release of the console by further manipulation of a single pushbutton at the console.

In accordance with another feature of my invention, a dispatch switching system is provided with a console equipped with a pushbutton set and a plurality of status indicating trunk lamps positionally arranged as a numerically ordered matrix wherein the console is operable to enable control means to cause the selection of a plurality of calling and/or called trunks and is further operable to place any or all such trunks in a hold condition independent of each other, with each such trunk subject to recall individually in arbitrary sequence by manipulation of the console pushbutton set.

In accordance with another feature of my invention, a dispatch switching system is provided with a console equipped with a pushbutton set and a plurality of status indicating trunk lamps positionally arranged as a numerically ordered matrix wherein the console is operable to establish conference connections between incoming and outgoing trunk circuits by pushbutton enabling of associated control means while maintaining voice connections between the console and all trunks priorly added or between the console and only the most recently added-trunk as determined by the selective manipulation of a single locking key at the console.

Figure 2:
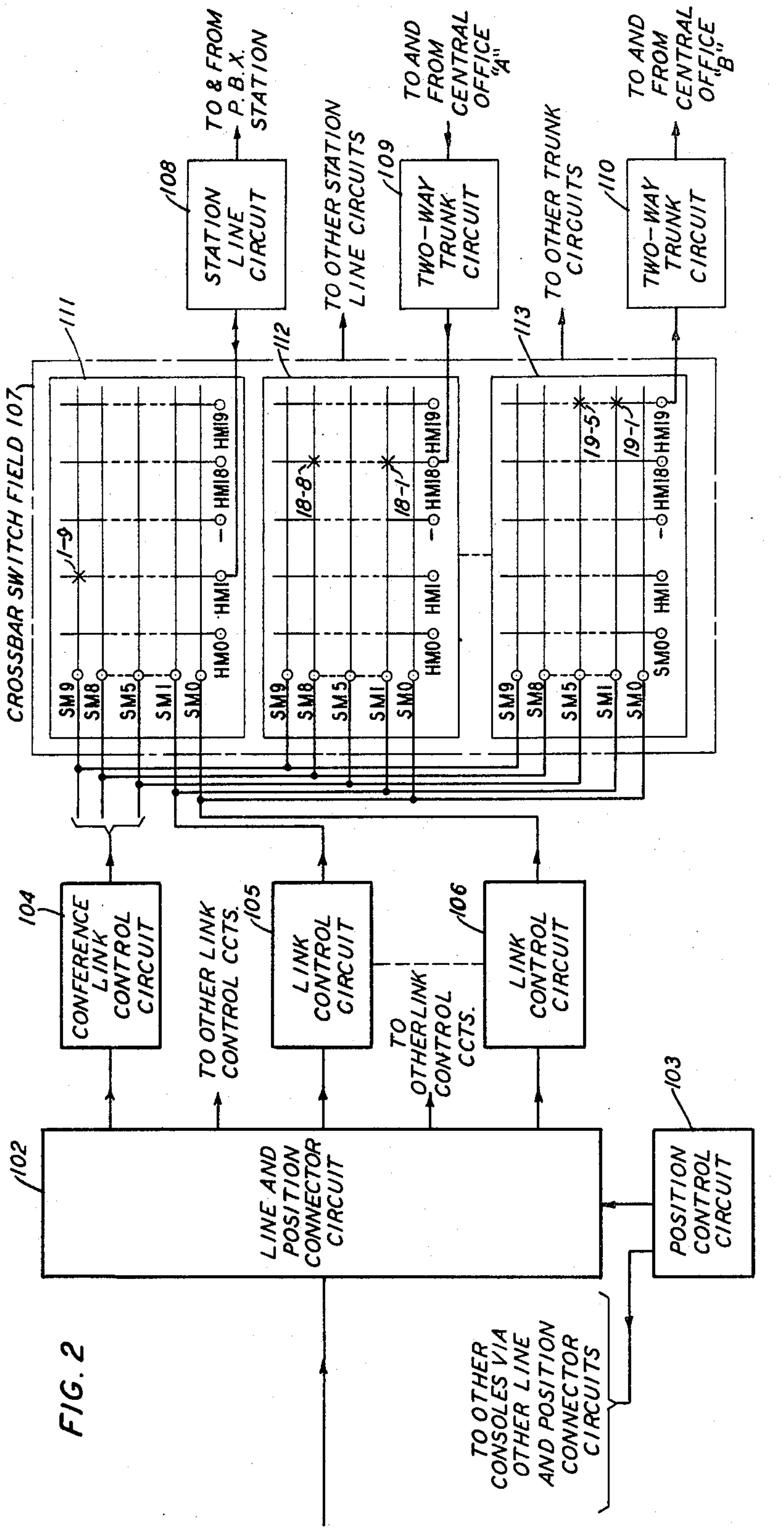
Figure 3:
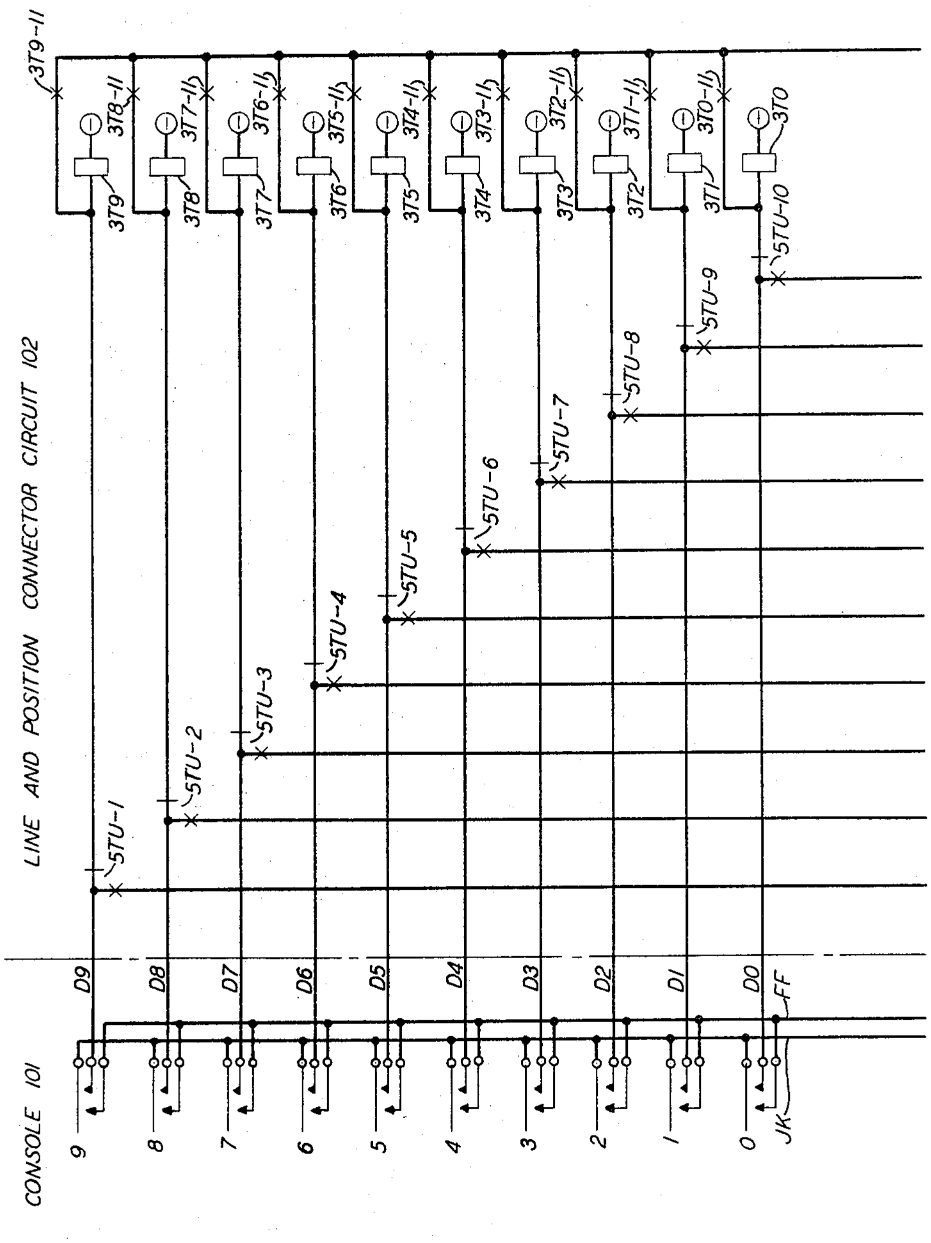
Figure 4:
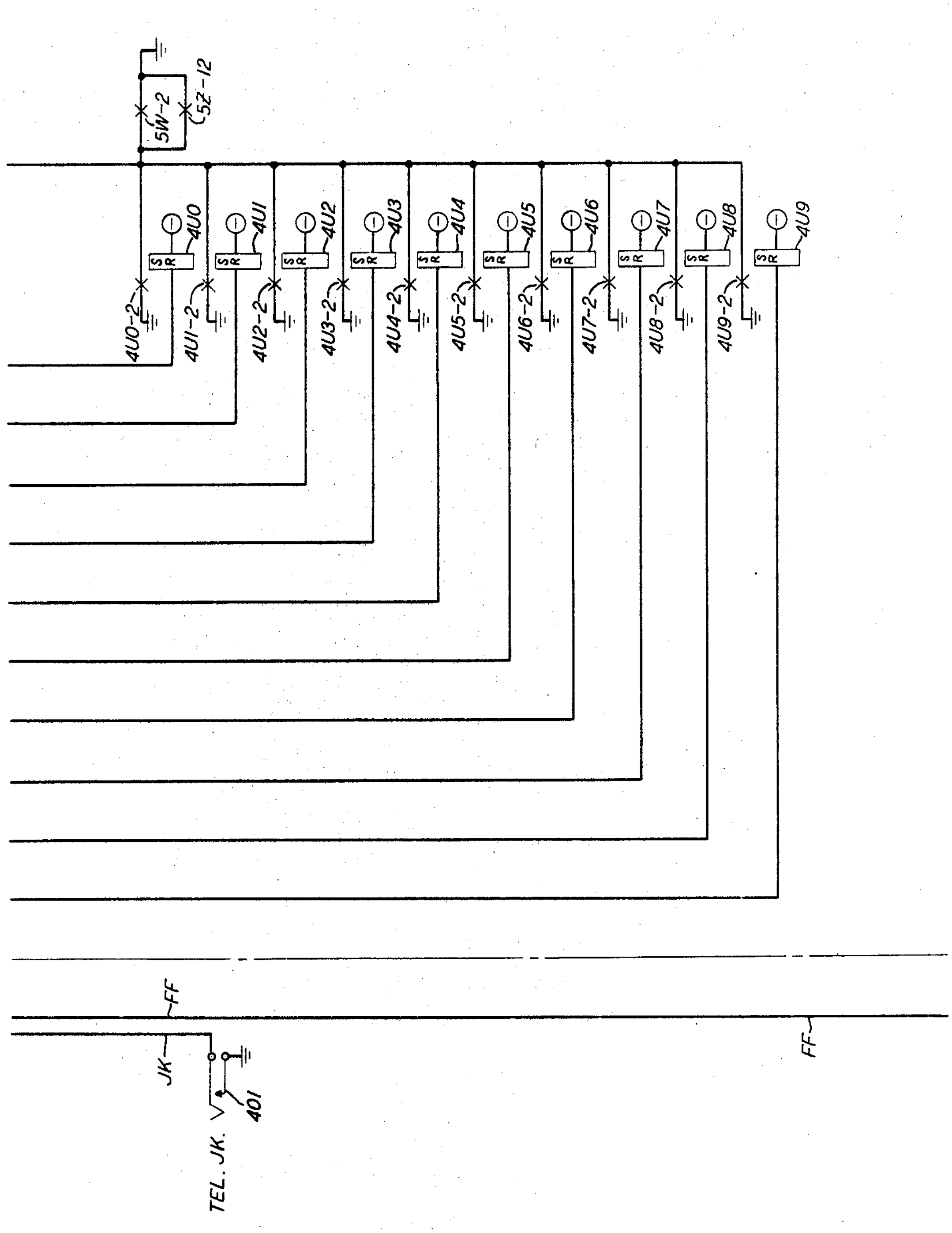
Figure 5:
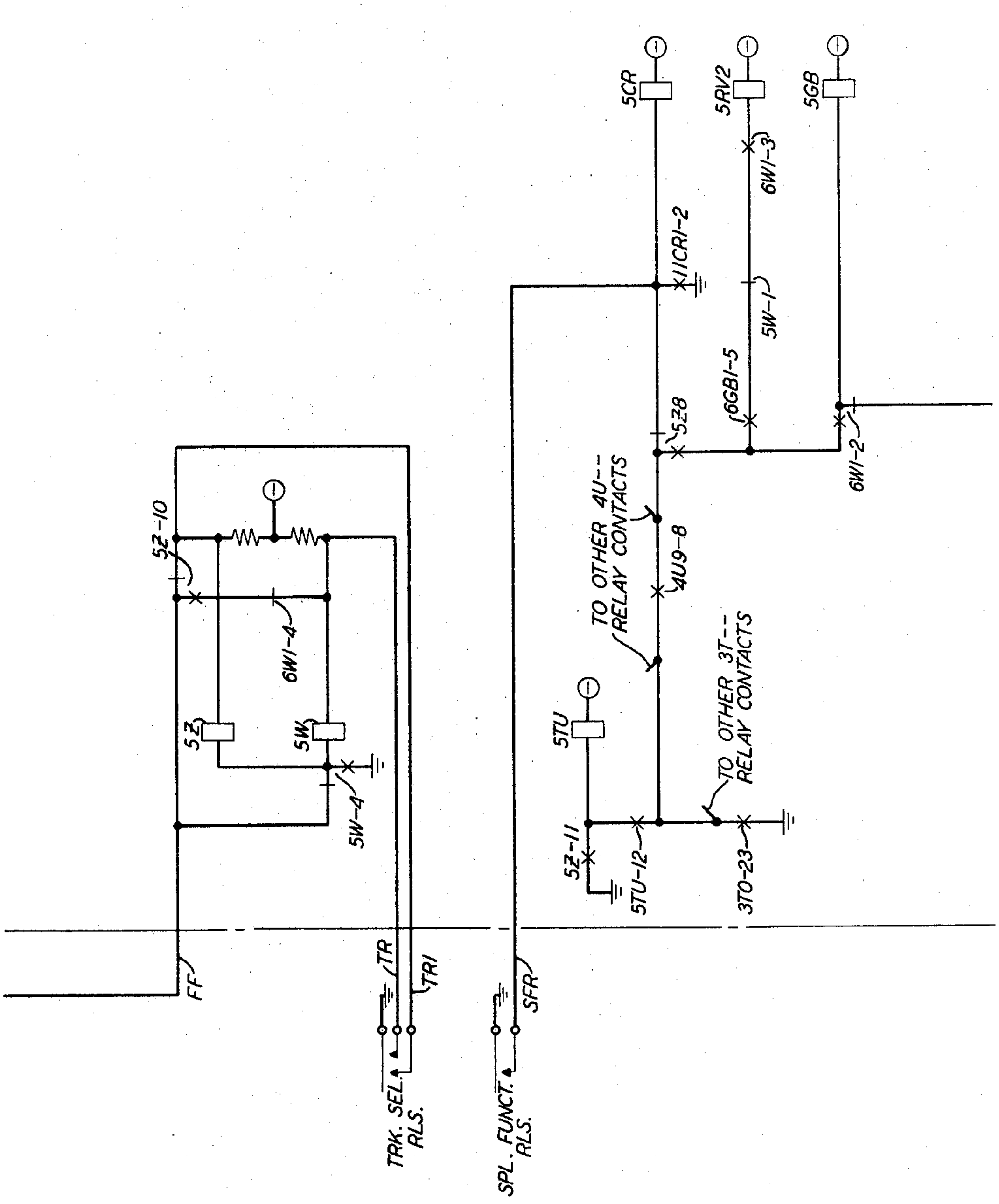

The foregoing objects and features, as well as others, of this invention will be more apparent from a consideration of the subsequent description and the drawing in which:

FIGS. 1 and 2 are essentially a block diagram showing the interrelation of the components of the exemplary embodiment;

FIGS. 3 through 20 show in greater detail the principal components of the exemplary embodiment; and FIGS. 21 through 25 show the manner in which FIGS. 1 through 20 should be arranged.

It will be noted that FIGS. 3 through 20 employ a type of notation referred to as "detached-contact" in which an X, shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing," by F. T. Meyer in the September 1955 publication of the American Institute of Electrical Engineers Transactions, Communications and Electronics, volume 74, pages 505–513.

The invention as described herein is particularly concerned with the attendant console as shown in FIG. 1 and with apparatus in line and position connector circuit 102, position control circuit 103, conference link control circuit 104, and link control circuits 105 and 105 which are represented by blocks shown with heavy lines in FIG. 2. The other equipment units are neither shown nor described in detail herein except where necessary for a complete understanding of the invention.

1. GENERAL DESCRIPTION

1.01 *Introduction*

Prior to beginning the description of the various connections established through the subject system, a brief description of console 101 and of the arrangement of the other circuit elements of the system will be undertaken.

Referring to FIG. 1, it will be noted that the console is equipped with a conventional handset 114 for voice communication between the attendant and the various calling and called parties served by the console. The extreme right-hand section of the console is shown comprising 100 windows, behind which are mounted status indicating lamps, each respectively associated with a particular trunk or station line circuit in the system.

As will be more apparent from that which is contained hereinafter, the illuminated condition of the lamp determines the status of the associated circuit. Thus, a darkened lamp indicates the circuit to be in its normal idle condition; a flashing lamp indicates an incoming call via the associated circuit; a fluttering lamp, which is manifested by momentary illumination of the lamp at a rate per minute greater than that for flashing, indicates a circuit which has been selected by the attendant console and which is ready to receive signaling; a winking lamp, which is manifested by a rate of momentary illumination slower than flashing or fluttering, indicates a circuit which has been placed in a hold condition by the console; and a constantly lighted lamp indicates a circuit which is currently engaged in a connection either with console 101, another console, or with another circuit.

It will be noted that the lamps are arranged with numerical designations for the vertical columns and horizontal rows; the horizontal coordinate ranging numerically from 0 through 9 and the vertical coordinate ranging from 00 to 90. Viewing this lamp arrangement as a matrix, the coordinate location of the lamp determines the code which is to be utilized in selecting the associated circuit. Thus, for example, the selection of the circuit associated with the lamp in the uppermost right-hand corner would be accomplished as hereinafter described by the pushbutton signaling of the digits 99.

In the center portion of the console a conventional dial is shown for use over trunks which terminate in equipment requiring the generation of dial pulse signals for call completion. It will be obvious from that which is contained hereinafter that the provision of this dial is not necessary for the invention and may, in fact, be replaced by the pushbutton signaling set which is described in a succeeding paragraph herein. In the center section of the console, the split key shown in the upper right-hand corner thereof is utilized by the attendant when he desires to maintain voice communication with all trunks priorly selected by the console or only with the most recently added trunk as will be described in detail hereinafter.

Referring now to the left-hand section of the console, a conventional pushbutton signaling set is shown which is used to generate the two digit code of the circuit to be selected as hereinbefore set forth. Immediately to the left of the pushbutton set is a row of six nonlocking keys with appropriate transparent designation plates adjacent to each key. Beneath certain of these transparent designation plates, as will be more apparent from the subsequent description, are status indicating lamps to provide supervisory signals associated with key functions. The uppermost key is designated "RING" and is used by the attendant to cause the generation of a ringing signal over trunks which require such signaling as will be more apparent hereinafter. Immediately beneath the ring key is a key similarly arranged which is designated "HOLD." The depression of this key by the attendant followed by the subsequent generation of a trunk code via the pushbutton set causes the associated trunk to be placed in a hold condition subject to recall by the attendant. Directly beneath the hold key is a key designated "TRK LINK RLS." The key is utilized by the attendant when a connection previously established between two trunks has been abandoned by one or both trunks without ringoff or hangup. In such an instance the depression of this key, followed by the depression of the involved link key, causes the release of the associated link connection as will be more apparent hereinafter. Directly beneath the trunk link release key is the "SPL FUNCT RLS" key for use when the attendant desires to cancel a previously enabled special function such as hold. The key directly beneath the special function key is designated as "TRK SEL RLS" and is utilized by the attendant when it is desired to cancel a previous partially signaled trunk selection code. The lowermost key, designated "CLEAR," is utilized by the attendant to release all trunks currently incoming to the console which are not interconnected by link circuits as hereinafter described.

The extreme left-hand column of keys are similarly arranged as described above and constitute the nonlocking pushbuttons associated with five link circuits and one conference link circuit. Upon the connection of two or more trunk circuits to the console, the momentary depression of any one of the link keys will cause the interconnection of these trunks and the concurrent release of the console from the connection with subsequent ability of the attendant to monitor this connection by depression of the associated link key. In similar fashion the conference link key, upon being depressed, causes the sequential connection of a plurality of previously selected trunk circuits to a conference network. As will be more apparent hereinafter, this trunk selection is accomplished automatically and in ascending numerical preference without regard to the sequence in which the trunk codes were initially generated from the console.

Referring now to FIG. 2, line and position connector circuit 102 comprises the equipment required by console 101 in order to bid for and select various trunk circuits, and to acomplish the various console functions as hereinafter described. Position control circuit 103 comprises the equipment which is common to the control of all line and position connector circuits, each of which is respectively associated with a console position. Conference link control circuit 104 comprises the control circuitry and amplifying and equalizing apparatus required to establish a conference connection among a plurality of previously selected trunk and/or station line circuits.

Link control circuits 105 and 106 comprise the control circuitry necessary to enable connections between various incoming and outgoing trunks and station line circuits.

For purpose of the embodiment as noted hereinbefore, a total of 100 trunks and station line circuits are terminated by means of status indicating lamps at the console. Each trunk or station line circuit is exclusively associated with a particular vertical appearance in crossbar switch field 107. Each of the link control circuits 105 and 106 is exclusively associated with a particular horizontal level. Each horizontal level, in turn, is multiplied to all corresponding horizontal levels of all other crossbar switches in the switch field. Conference link control circuit 104 is shown as associated with the five upper horizontal levels of crossbar switch 111 which, in turn, are multipled to the corresponding levels of all other switches in the switch field. It will, therefore, be recognized that, since each trunk and station line circuit has individual vertical appearances and since each horizontal level is multipled to all other horizontal levels, any given trunk circuit may be connected to any other trunk circuit or station line circuit by the closure of two crosspoints wherein each crosspoint is associated with the same or corresponding horizontal level and the appropriate vertical unit is associated with the respective trunk or station line circuit.

1.02 *Link connection between trunks 109 and 110*

Referring now to FIGS. 1 and 2, an incoming connection between two-way trunk 109 and console 101 will first be described. Immediately thereafter, the manner in which a connection is established from console 101 to two-way trunk 110 will be described. Having described this connection, the description will proceed to the manner in which the attendant interconnects trunks 109 and 110 via an available link and concurrently therewith is automatically released from the connection.

Commencing now with the description, trunk circuit 109 is enabled in response to a call from an associated central office A. The status indicating lamp at the console which is associated with this trunk will be caused to change from a darkened to a flashing condition. For purpose of explanation we shall assume that incoming trunk circuit 109 is exclusively associated with status indicating lamp 09 which is located at the intersection of the vertical coordinate 00 and the horizontal coordinate 9 and thus is in the extreme lower right-hand corner of the lamp panel.

Upon recognizing the flashing condition of status lamp 09, the attendant selectes incoming trunk 109 by key pulsing the code represented by the positional appearance of the lamp in the matrix; namely, the digits "zero" and "nine." These digits are registered in line and position connector circuit 102, thereby enabling control circuitry whereby incoming trunk circuit 109 is placed in voice communication with the console position by a path which is independent of crossbar switch field 107 as will be more apparent from the subsequent detailed description.

Assuming at this time that the request from the station initiating the call via incoming trunk 109 indicates the completion of a connection to another central office which is served by two-way trunk circuit 110, the attendant key pulses the appropriate code for outgoing trunk 110. For purpose of explanation, we shall assume that outgoing trunk circuit 110 is represented by the lamp in the lower left-hand corner of the panel indicated by the intersections of the coordinates 00 and 0. Therefore, the attendant key pulses code 00 so as to cause completion of the connection through outgoing trunk circuit 110 by a path independent of crossbar switch field 107 through to associated central office B. It is, of course, obvious that central office B may be any one of a number of various types of central offices. For purpose of the embodiment, we shall assume that central office B requires a form of signaling known as dial pulsing. For this purpose the dial shown at the center of console 101 is provided. However, it will be recognized that the pushbutton set which controls the selection of trunks may also be utilized for outward signaling to other central offices assuming the provision of suitable translating and transmission means which are well known in the art. Upon completion of the dialing of the directory numbers of the station located at central office B, the called station is connected to trunk 110 in the well-known manner. At this point the dispatch attendant is in telephonic communication with the originating party via trunk circuit 109 and with the called party via trunk circuit 110. In addition, as will be more apparent hereinafter, a voice path also extends between trunk 109 and trunk 110.

If we assume momentarily that trunk circuit 110 will not meet the requirements of the connection because of the unavailability of the called party or for any other reason, the attendant at console 101 may cause the release of this trunk circuit by operation of the TRK LINK RLS key followed by the key pulsing of the trunk code 00. Such action enables line and position connector circuit 102 to release trunk 110 thereby restoring the original connection between the attendant console and incoming trunk circuit 109.

However, assuming that trunk circuit 110 meets the requirements of the connection and no particular purpose exists for the dispatch attendant to monitor the connection at this time, the dispatch attendant may cause the interconnection of the calling and called parties by the momentary depression of a link key such as link key 1. For purpose of the embodiment link 1 is associated with link control circuit 105. Thus, upon the operation of link key 1, link control circuit 105 is enabled thereby causing the operation of select magnets SM1 on all crossbar switches in crossbar switch field 107. The operation of the select magnets, in turn, permits the operation of the hold magnets associated with the trunk circuits currently connected to the console as recorded in line and position connector circuit 102. Thus, incoming trunk circuit 109 is connected via hold magnet HM18 on crossbar switch 112 through crosspoints 18–1, via level 1 associated with select magnet SM1 and thus over the multiple which extends via select magnet SM1 on crossbar switch 113, through crosspoint 19–1, and the vertical associated with hold magnet 19 to outgoing trunk 110. Concurrently therewith link control circuit 105 signals line and position circuit 102 to disable the voice connection which existed between these trunks and console 101. At this point the console is free to establish other connections as described hereinbefore and in the following.

1.03 *Link monitor*

Since the console is connectible to any trunk regardless of the trunk's signaling requirements, certain of the trunks may be of the type which require a manual ringdown or hangup to cause release. Where this fails to occur between two such circuits, it is, of course, obvious that the connection will remain established and a link will be unnecessarily removed from service. To obviate this difficulty, console 101 is arranged such that, upon the depression of link 1 key, telephonic communication is restored between the dispatch attendant and the trunk circuits currently connected via that link. Where no conversation is heard by the dispatcher, he may challenge the parties and, assuming no response, recognize abandonment of the connection by the parties and may thereupon cause the release of the link by depressing the TRK LINK RLS key and the link 1 key in sequence thereby restoring the links to normal.

Where the connection is released by the parties connected through the link, the link is automatically released and made available for reuse as will be described in detail hereinafter.

1.04 *Hold feature*

Under certain conditions, it may be desirable for the attendant to place certain trunk circuits and/or station line circuits priorly selected by the console in a hold condition. This is accomplished in the case of incoming trunk 109, for example, by the attendant depressing the nonlocking hold key and thereafter key pulsing trunk code 09. Upon so doing, the voice connection priorly existing between incoming trunk 109 and console 101 is disconnected by line and position connector circuit 102. Status indicating lamp 09 is placed in a winking condition, and concurrently therewith a bridge network in the trunk is inserted across the loop extending through incoming trunk circuit 109 to central office A so as to maintain supervision. This hold feature may be similarly exercised for a plurality of other trunks or line circuits selected by console 101, thereby permitting a plurality of trunks to be concurrently placed in a hold condition, each of which may be recalled as hereinbefore described by the key pulsing of the trunk designation code.

1.05 *Conference link connection*

The manner in which a conference link connection is established by the dispatch attendant is very similar to the establishment of a connection via a conventional link. However, the manner in which it is accomplished by the associated control equipment differs extensively. Thus, in the following we shall assume that a connection exists between the console and incoming trunk 109 as described above and that the call indicates a requirement that trunk circuit 110 and station line circuit 108 be added to the connection in conference fashion. Thus, the attendant key pulses 00 to cause connection to outgoing trunk 110 as hereinbefore described. He thereupon key pulses the designation code for station line circuit 108, which may advantageously be the digits 90, to cause selection of line circuit 108 in similar fashion. At this point, station line circuit 108 and incoming trunk 109 and outgoing trunk 110 are all connected through to the console. Upon the enabling of the nonlocking conference link key, line and position connector circuit 102 and position control circuit 103 are activated to cause the enabling of conference link circuit 104.

Conference link control circuit 104 may advantageously comprise apparatus suitable for a conference connection comprising five stations or lines. An inspection of FIG. 2 will reveal that a total of five horizontal levels are thereby associated with conference link circuit 104. Thus, levels 5 through 9 (of which only 5, 8 and 9 are shown) each provide independent paths to the conference link control circuit and via the conference link control circuit to each other thereby permitting the switching in of suitable amplifying and equalizing apparatus as required in the well-known manner.

Upon the depression of the conference link key, conference link circuit 104 begins a hunting operation which seeks out the selected trunks in ascending numerical order as determined by the designation code, so as to cause the connection of the trunks via their respective associated verticals through an independent conference horizontal level to conference circuit 104. Thus, for example, outgoing trunk 110 is connected via hold magnet 19 of switch 113, through crosspoints 19–5, horizontal level SM5, through to link control circuit 104. In similar fashion, incoming trunk circuit 109 is connected via hold magnet 19 of crossbar switch 112 through crosspoint 18–8, horizontal level SM8 through to conference link circuit 104 and again in similar fashion, station line circuit 108 is connected through via hold magnet HM1 of switch 111 through crosspoint 1–9, horizontal level SM9 to conference link control circuit 104. Thus, via conference link circuit 104, trunks 109, 110 and station line circuit 108 are interconnected with each other. Concurrently therewith line and position connector circuit 102 disables the trunk voice connections to the console thereby releasing the console for subsequent activities as required.

1.06 *Privacy*

During the course of establishing a conference connection or conventional link connection, it may be desirable for the attendant to maintain voice communication with all priorly added parties as above described. This is accomplished by permitting the "split" key of console 101 to remain in the position as shown in FIG. 1 thereby permitting simultaneous enablement of voice paths between console 101 and each trunk or station line circuit as selected. However, the enabling of the split key by rotation to the right enables means in line position circuit 102 which causes the disablement of all previously existing voice connections to the console upon the establishment of a succeeding one between the console and the most recently connected trunk.

2. DETAILED DESCRIPTION

2.01 *Selection of incoming trunk 109 by console 101*

Figure 15:
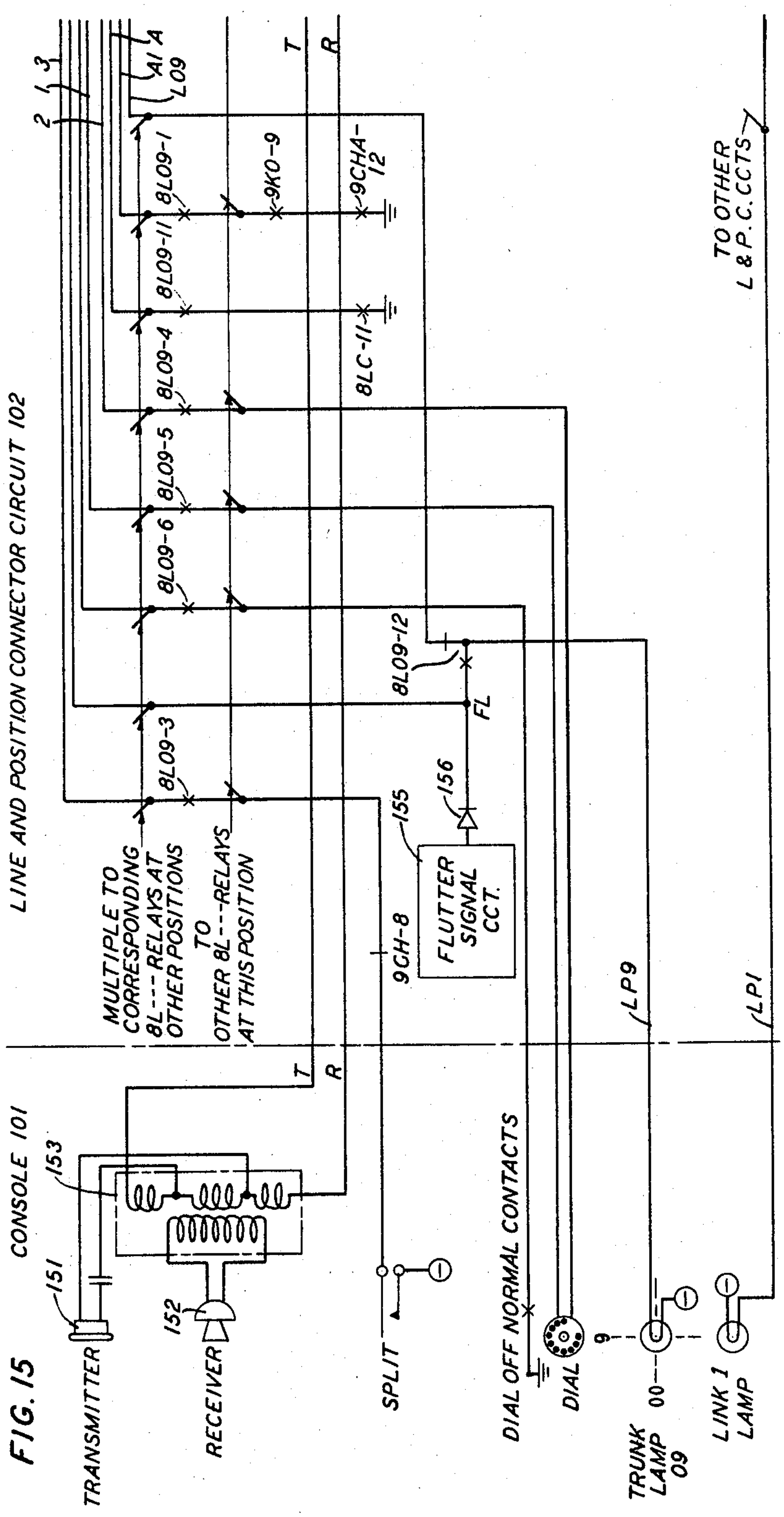
Figure 16:
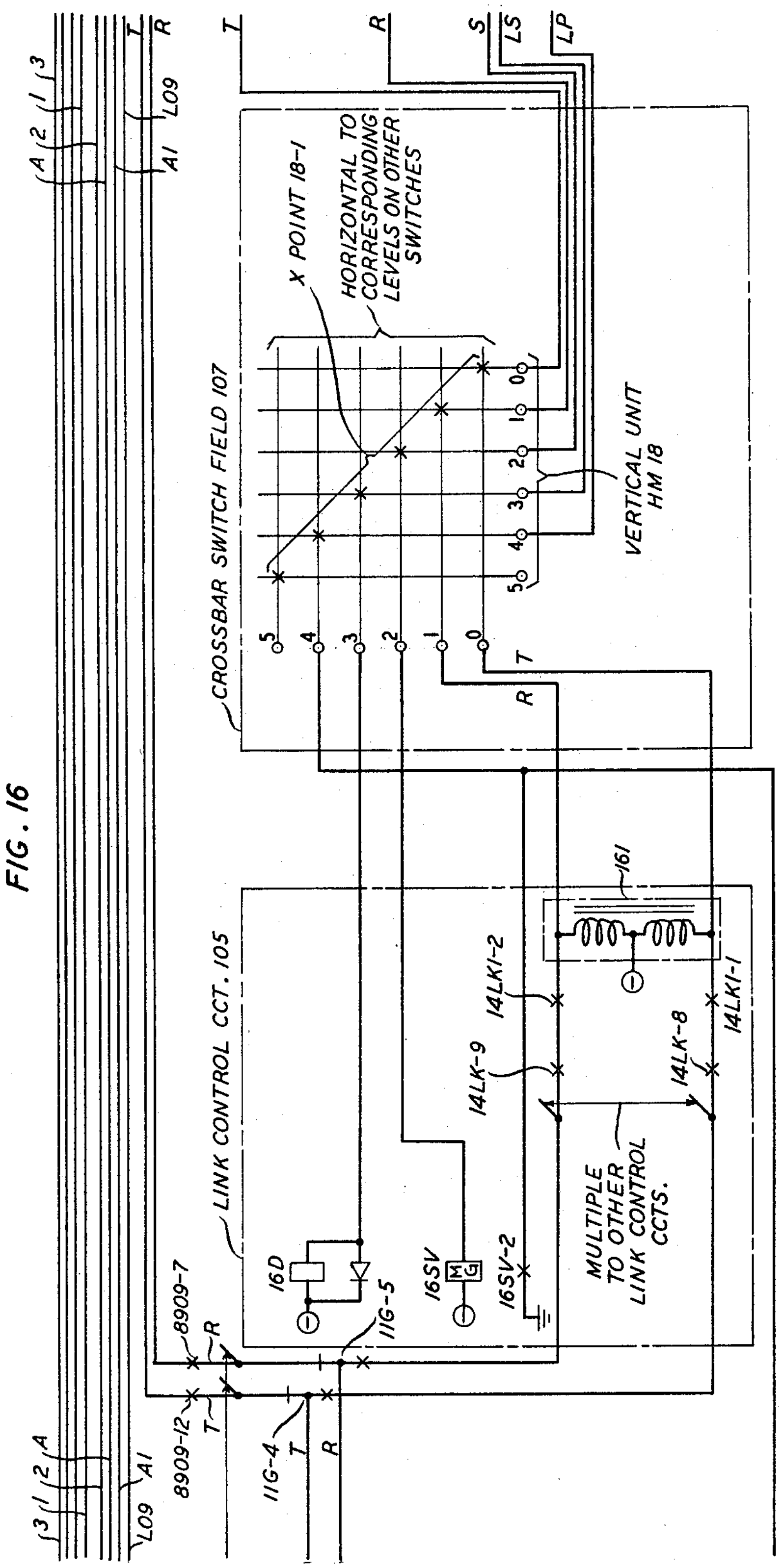
Figure 17:
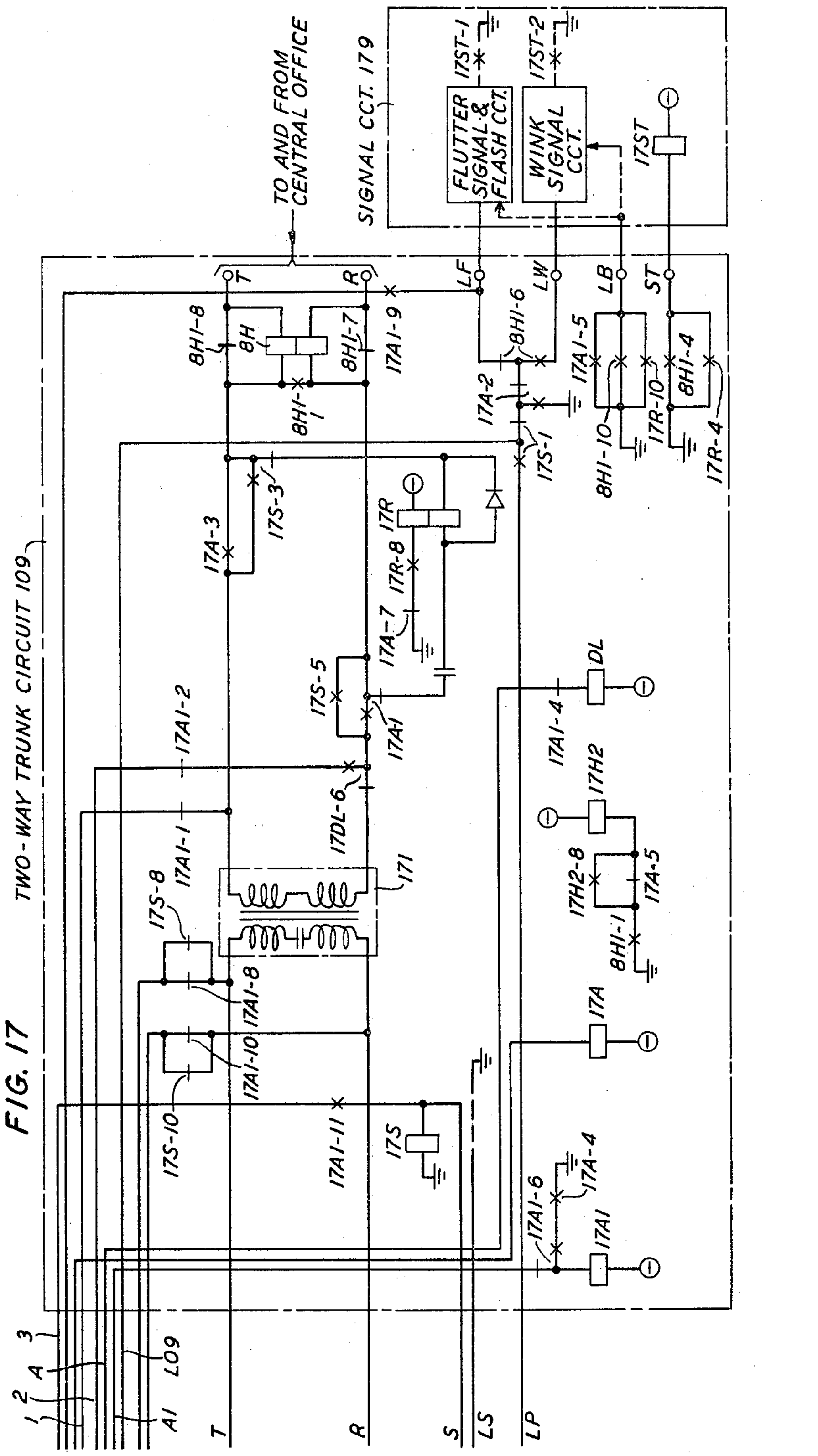

Referring to FIGS. 15, 16 and 17 as hereinbefore discussed lamp 09 at console 101 is the status indicating lamp exclusively associated with trunk 109. When incoming trunk 109 is enabled in the well known fashion by a connection extended from the corresponding central office, a flashing signal is impressed on conductor L09, FIG. 17, from trunk 109. This flashing signal is closed through by circuitry well known in the art which forms no part of this invention and thus will not be discussed in detail herein. The flash signal is extended over the L09 conductor through released break contacts 8L09–12, FIG. 15, and via the LP0 lead to console 101 so as to cause the lighting of lamp 09 in a flashing manner, thus alerting the attendant to a request for service from trunk 109.

Referring now to FIGS. 3 through 6, as hereinbefore discussed, in order to select trunk 109 the attendant depresses pushbuttons 0 and 9 in sequence at console 101. The depression of button 0 extends a ground present on the JK lead from enabled telephone jack 401, through the upper make contact associated with pushbutton 0, via the D0 lead, through released break contact 5TU–10 so as to enable relay 3T0 thereby recording the transmission of the 0 tens digit for the selected trunk. The depression of button 0 also extends the ground present on the JK lead through its lower make contact via the FF lead so as to enable relay 5W which will be recognized as one part of a conventional WZ relay flip-flop as well known in the art.

Operated make contact 3T0–11 extends a locking ground for relay 3T0 through operated make contact 5W–2 to ground. The release of button 0 removes the ground placed on the FF lead thereby removing the shunt from the 5Z relay permitting it to operate to ground present on the enabled 5W–4 make contact. The operation of relay 5Z enables make contact 5Z–11 thereby completing the operate path of relay 5TU which locks operated through enabled make contacts 5TU–12 and 3T0–23 to ground. The subsequent operation of pushbutton 9 extends ground present on the JK lead in console 101 through the upper make contact of button 9 via the D9 lead to the line position connector circuit 102, through enabled make contact 5TU–1 so as to operate relay 4U9. Concurrently therewith ground is extended over the FF lead to the line position connector circuit 102 so as to shunt release relay 5W in the well known fashion. At this point, line and position connector circuit 102 has recorded the designation code of the trunk to be selected.

Figure 7:
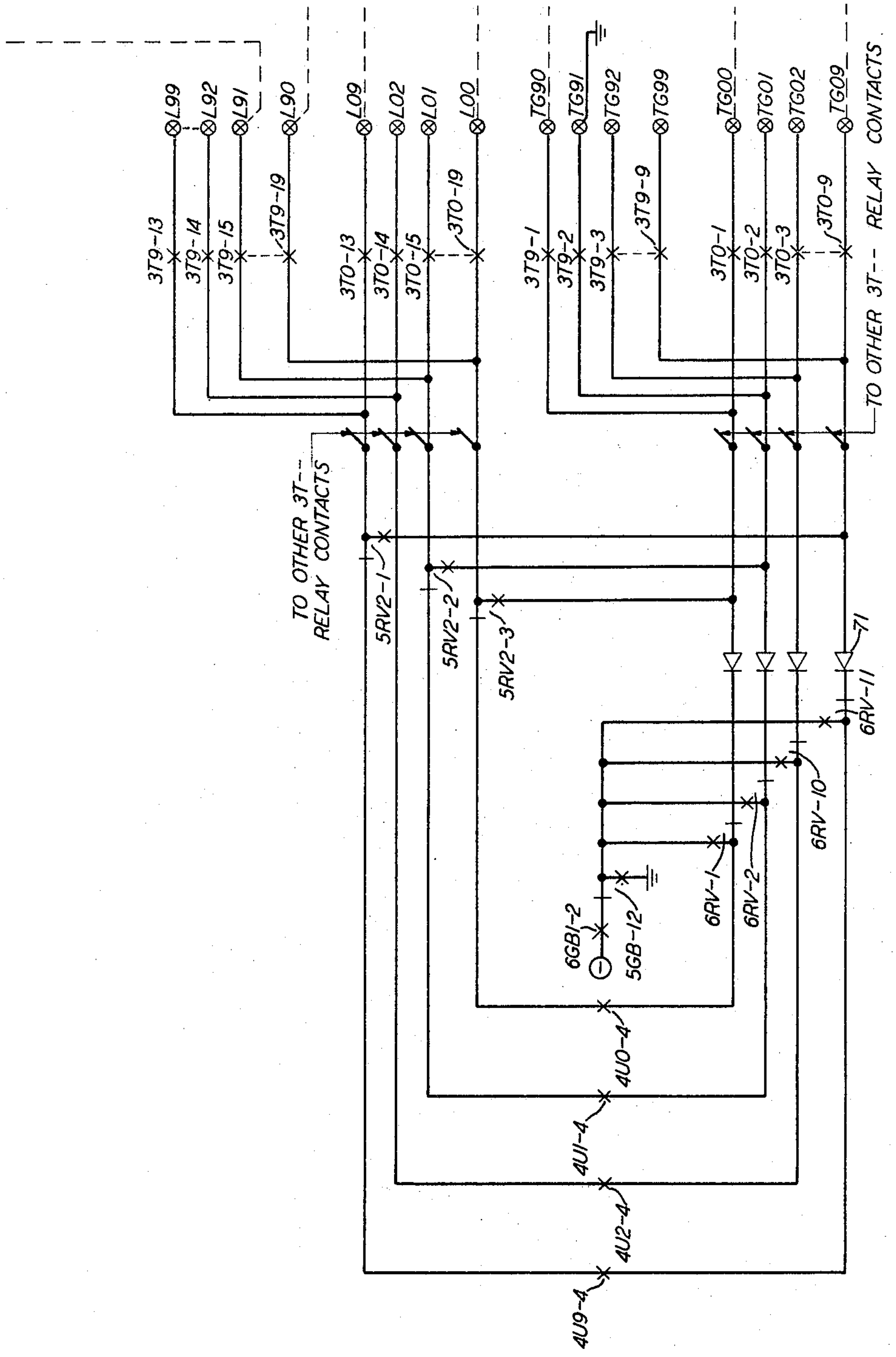
Figure 8:
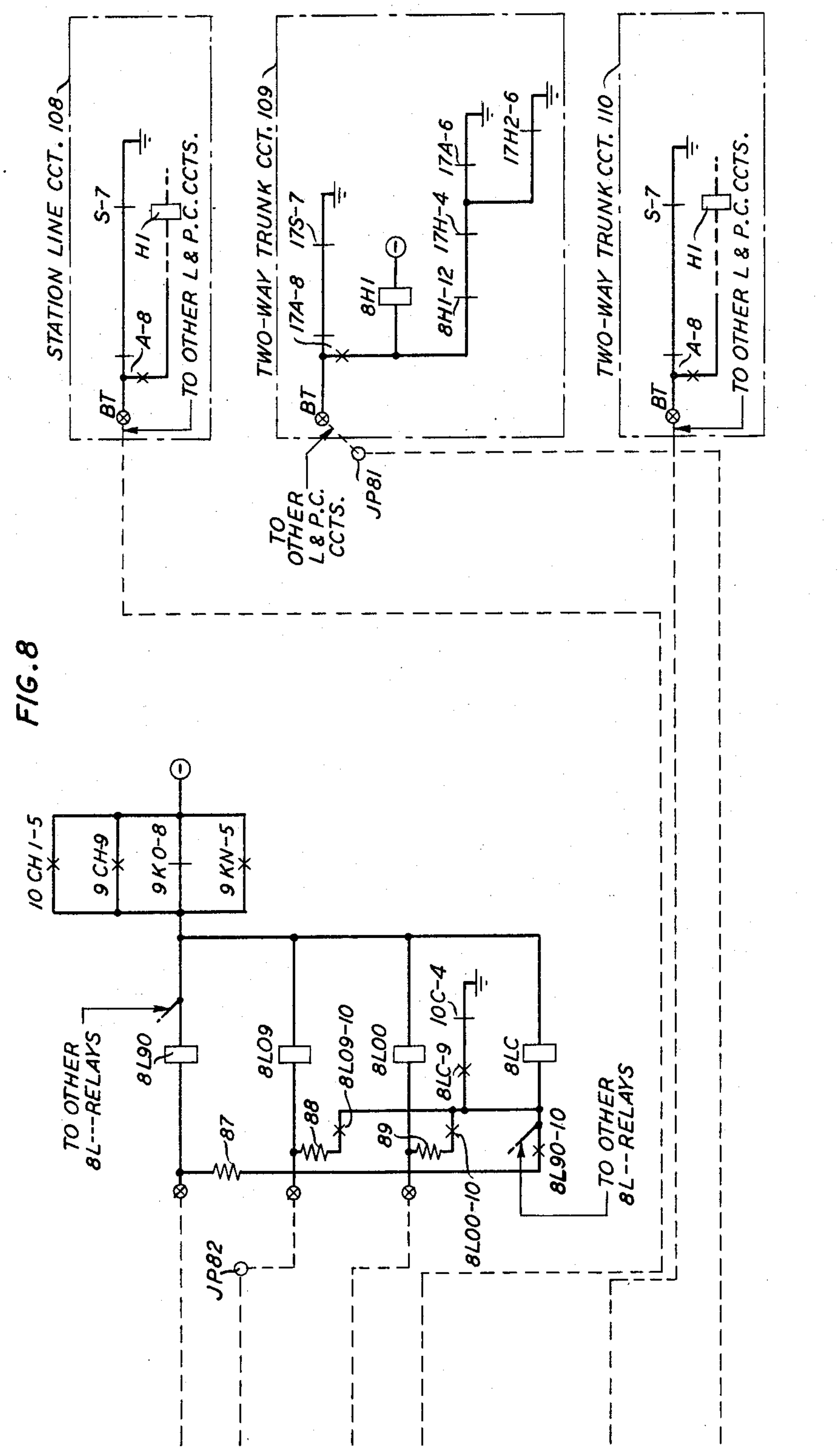

Referring now to FIGS. 7 and 8, it will be noted that there exists a TG00 through 99 punching, each of which is exclusively associated with a particular trunk or station line circuit. It will be further recognized that a correspondingly designated L00 through L99 punching is associated with an 8L00 through 8L99 relay in line position connector circuit 102. The TG— punchings are cross-connected to busy test BT leads in each of the trunk circuits; the presence or absence of ground on each BT lead indicates the availability or non-availability, respectively, of the associated trunk at this time.

Proceeding now with the description, as hereinbefore stated relays 3T0 and 4U9 are in an operated condition. Accordingly, ground is extended from trunk 109 through released break contacts 17S–7 and 17A–8 via jumper 81 to punching TG09 in FIG. 7, and thence through enabled make contact 3T0–9, diode 71, released break contact 6RV–11, enabled make contact 4U9–4, released break contact 5RV2–1 through enabled make contact 3T0–13 to the L09 punching. This ground potential is further extended by jumper JP82 to the punching associated with the operate winding of the 8L09 relay. The other side of the 8L09 relay extends through break contacts on relay through 9K0–8 to negative battery. Relay 8L09 accordingly operates at this time. The subsequent enabling of make contact 8L09–10 extends ground present on jumper JP82, through resistance 87, to the winding of the 8LC relay. Relay 8LC accordingly operates and locks operated through enabled make contact 8LC–9 and released break contact 10C–4 to ground. The release of the push button 9 in console 101 removes ground from the FF lead to line and position connector circuit 102, thereby releasing relay 5Z and restoring relays 5TU, 3T0 and 4U9 to normal.

Figure 9:
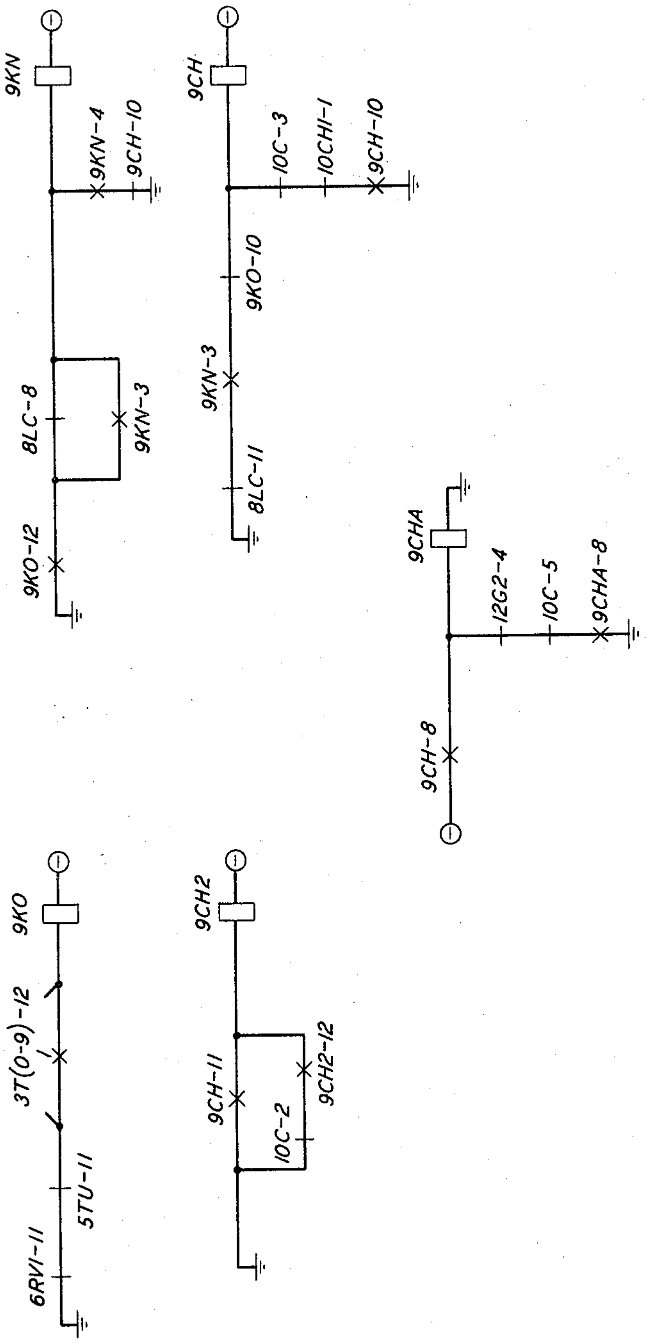

Referring now to FIG. 9, the operation of relay 3T0 completed the obvious operate path of relay 9K0 in line and position connector circuit 102. The enabling of make contact 9K0–12 extends ground through released break contact 8LC–8 so as to operate relay 9KN. Relay 9KN accordingly locks operated through enabled make contact 9KN–4 and released break contact 9CH–10. The subsequent operation of relay 5TU as hereinbefore described opens the operate path of relay 9K0, restoring it to normal. Relay 9CH accordingly operates at this time via negative battery which extends through the 9CH relay winding, released break contact 9K0–10, operated make contact 9KN–3 and released break contact 8LC–11 to ground. The operation of relay 9CH completes the obvious operate path of relay 9CH2 and 9CHA.

The above-described operation of relay 8L09 closes through the talking and signaling leads between console 101 and trunk 109. Referring to FIGS. 15, 16 and 17, it will be seen that the enabling of make contacts 8L09–3, 8L09–6, 8L09–5, 8L09–4, 8L09–11, 8L09–1, 8L09–12, and 8L09–7 extend a plurality of leads from line and position connector circuit 102 through FIG. 16 to two-way circuit 109 in FIG. 17. As will be apparent hereinafter, these leads provide a voice channel and a signaling channel for control of the selected trunk by the console.

At this time, ground is extended via enabled make contact 8LC–11 through enabled make contact 8L09–11 via the A lead from line and position connector circuit 102 to operate relay 17A in trunk 109. The operation of relay 17A extends ground from trunk 109 through released break contact 17S1 via the L09 lead to line and position connector circuit 102 where it is extended by multiple to all other line and position connector circuits and thus to their corresponding 8L09 relays which are in a released state and thence to their respective trunk lamps 09 which are thereby steadily lighted to indicate a busy condition of the associated trunk. However, in the instant circuit this ground is inhibited at enabled transfer contact 8L09–12 and thus is not applied to the trunk lamp 09 at console 101. The enabling of transfer contact 8L09–12 does, however, apply a flutter signal in the well-known manner from flutter signal circuit 155 through diode 156 to trunk lamp 09, thereby informing the attendant at console 101 that the leads from the selected trunk are continuous through to the console.

At this time the console attendant's telephone circuit, which is comprised of transmitter 151, receiver 152 and transformer 153, is complete through trunk circuit 109 via a path which extends via the T and R conductors from console 101 through released break contacts 11G4 and 11G5, enabled make contacts 8L09–12 and 8L09–7 in line and position connector circuit 102 and thence to trunk circuit 109 through released break contacts 17S–8 and 17S–10 to one side of repeat coil 171. The voice path is continuous from the other side of repeat coil 171 through enabled make contact 17A–3 and released break contact 17DL–6, enabled make contact 17A–1 through to central office A and thus to the calling station.

At this time the calling party may converse with the dispatch attendant and inform the attendant of his specific requirements, thus resulting in subsequent release by the calling party or connection of the calling party through to a called station via an associated trunk circuit or station line circuit as hereinafter described.

2.02 *Release of the calling trunk*

Assuming for purpose of explanation that it is not necessary for the call to proceed any further than the connection to the attendant console, the attendant may release the connection by depressing the CLR key at console 101 to cause release of the selected trunk circuit 109.

Figure 10:
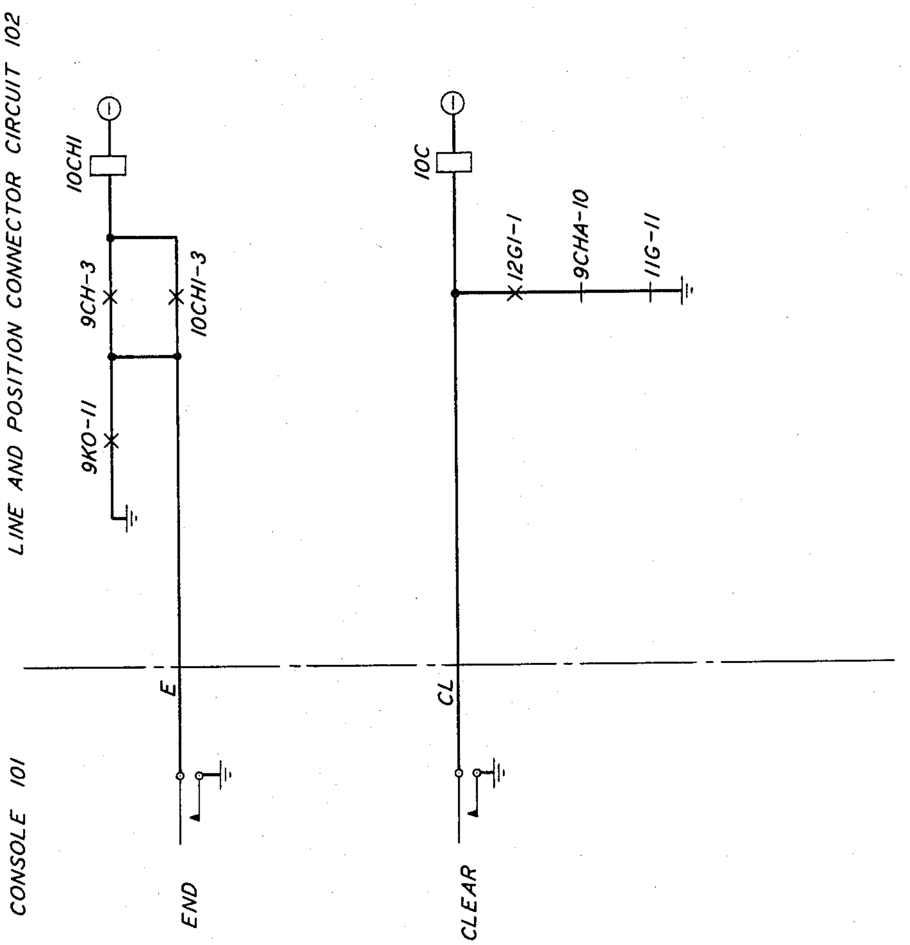

Referring to FIG. 10, the enabling of the CLR key extends ground so as to momentarily operate relay 10C. The enabling of break contact 10C–4 opens the locking path for relays 8LC and 8L09, thus restoring the circuit to normal. The attendant at console 101 may thereupon continue serving other calls as hereinbefore described.

2.03 *Selection of two-way trunk circuit 110*

We shall assume that the conversation which ensues between the calling party and the dispatch attendant indicates the requirement that the call be extended to another station served by an adjacent central office which is accessible through two-way trunk circuit 110.

As hereinbefore discussed, the designation code of two-way trunk circuit 110 is 00, as determined by its corresponding coordinate location in the lamp panel. Thus, to select trunk circuit 110, the attendant key pulses the aforesaid designation code and thereby causes selection of trunk circuit 110 in a manner identical to that hereinbefore described for trunk circuit 109. Thus the trunk lamp at all other console positions light in a steady manner to indicate the current unavailability of trunk circuit 110, while lamp 00 is lighted in a fluttering manner at console 101 to indicate the readiness of trunk 110 to receive signalling.

As hereinbefore described, upon the keying of the tens digit of the trunk designation code, relay 9K0 operates. The enabling of make contact 9K0 extends ground present on the 9CHA–12 make contact through the 8L09–1 contacts via the A1 lead from line and position connector circuit 102 so as to operate relay 17A1 in two-way trunk circuit 109. Relay 17A1 locks operated through enabled make contacts 17A1–6 and 17A–4 to ground. The operation of relay 17A1 interrupts the continuity of the signalling leads which extend from the console through to trunk circuit 109 via enabled break contacts 17A1–1 and 17A1–2.

To simplify the drawings, the circuitry for two-way trunk circuit 110 has not been shown in detail since it is identical in structure to trunk circuit 109 which is shown in detail on FIG. 17. Thus at this point we shall assume that the apparatus shown on FIG. 17 is that which is contained in trunk 110. Accordingly, the apparatus is in the condition described previously upon selection of trunk 109. Thus relay 17A1 is in a released condition, and the signalling leads which extend from the dial shown in console 101 (FIG. 15) are extended through the line and position connector circuit 102 via conductors 1 and 2 to trunk circuit 110 and thence through released break contacts 17A1–1 and 17A1–2; enabled make contacts 17A–3, 17DL–6 and 17A–1 through to the tip and ring leads to the called central office.

At this time the dispatcher may dial the required directory number of the called station. Upon answer by the called party, it will be noted that the voice communication paths which extend from console 101, via the T and R leads, through to the selected trunks is multipled at the junction point of the make contacts 12 and 7, respectively of the 8L—relays as shown in FIG. 15. Thus conversation may ensue between calling party, the called party and the dispatcher.

In certain situations this conversation may be extremely brief and the console attendant may cause the release of the selected trunks by operation of the CLEAR key as previously described. However, where it is necessary for the conversation between the calling and called parties to extend over a longer interval, the dispatch attendant may cause the exclusive interconnection of the two parties and the concurrent release of the console by the depression of a link key as set forth in the following section.

2.04 *Through connection via a link*

Assuming that a through connection independent of console 101 is required between trunks 109 and 110, the dispatch attendant will momentarily scan the link buttons as shown in FIG. 1, which were described in detail earlier. We shall assume at this time that link 1 is available, as manifested by the darkened condition of the lamp adjacent thereto. The depression of the link 1 key extends a ground over the G2 lead of FIG. 11 to cause the operation of relay 11CR1 via an obvious circuit. Concurrently therewith, ground is extended via the LK lead of FIG. 11 from key link 1 through the line and position connector circuit so as to operate relay 14LK in link control circuit 105. The enabling of make contact 11CR1–3 in FIG. 11 extends ground through the 11G relay winding through released break contact 11G–6, via the GT lead to position control circuit 103, through released break contact 13GT–3 to negative battery. The released state of relay 13GT indicates that no other console position is attempting to enable link control circuit 105 at this time. It is of course obvious that the enabled condition of relay 13GT would open the afore-described operate path of relay 11G. Relay 11G accordingly operates at this time. An independent source of battery is thereupon applied to the 11G relay winding through enabled transfer contacts 11G–6. Enabled make contact 11G–12 extends ground over the GTA lead from line and position connector circuit 102 to cause the operation of relay 13GT in position control circuit 103. The enabling of break contact 13GT–3 removes negative battery from the GT lead, thereby inhibiting concurrent link selection by another console position at this time.

Relay 12G1 operates at this time by an obvious circuit which extends through enabled make contact 11G–11. Relay 12G1 locks operated through enabled make contact 12G1–3 and released break contacts 10C–1 and 9CHA–1 to ground. Relay 12G2 also operates at this time by an obvious circuit. Relay 9CHA thereupon releases at this time because of the operation of break contact 12G2–4, thereby recording the seizure of an available link circuit.

Figure 11:
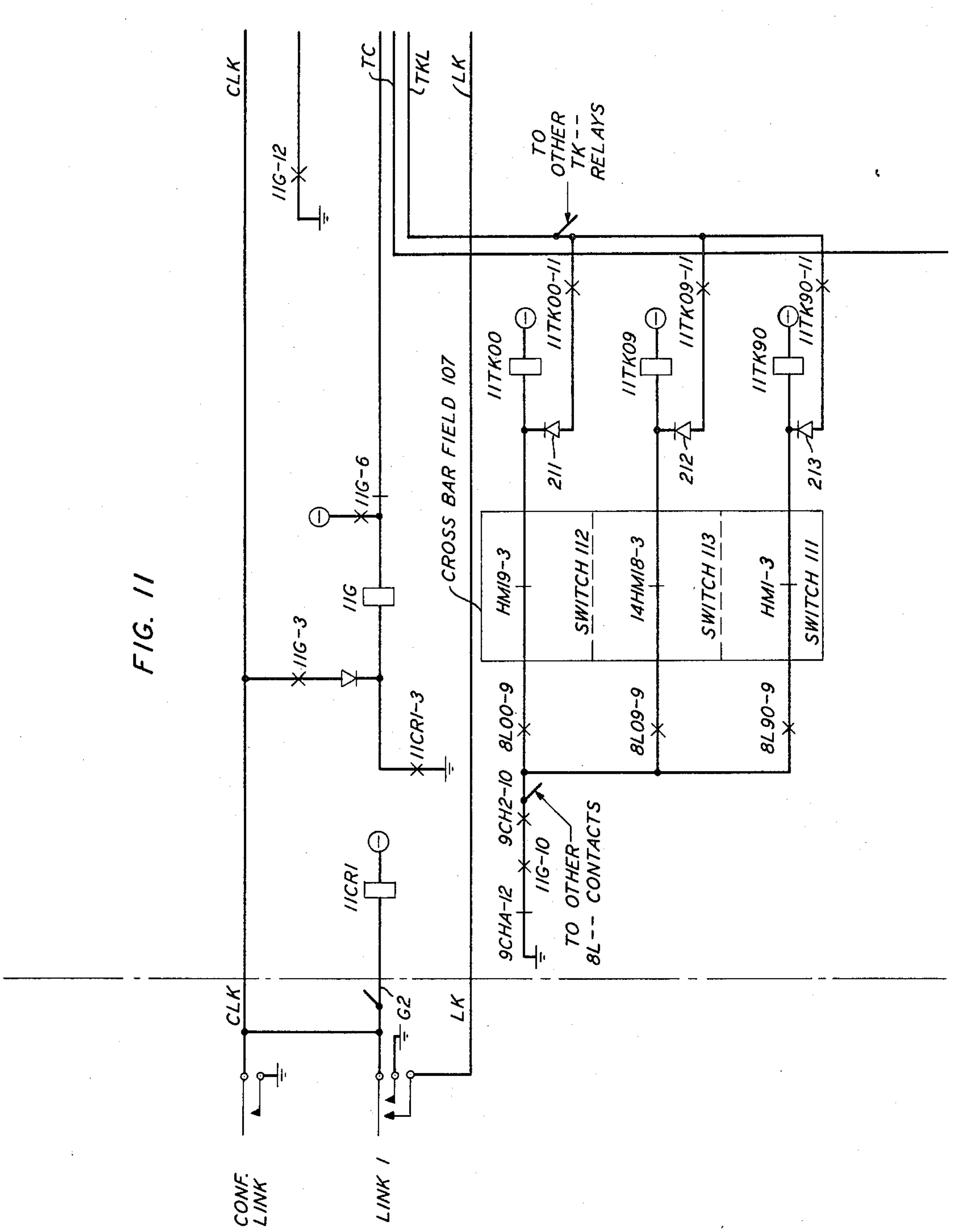

Referring now to FIG. 11, the release of break contact 9CHA–12 extends ground to the 11TK00 and 11TK09 windings through enabled make contacts 11G–10, 9CH2–10 and make contacts 9 of the respective 8L00 and 8L09 relays, through released break contacts on hold magnets exclusively associated with the respective trunks to the respective windings of the two relays. Relays 11TK00 and 11TK09 thereupon operate.

Relay 14LK1 operates in link control circuit 105 at this time by a path which extends from battery through the 14LK1 winding, 16SV–5 released, 14LK–11 operated, via the TCA lead to line position connector circuit 102 through respectively designated make contacts 5 on the 11TK—relays to ground. Enabled make contact 14LK1–5 operates relay 14LK2 which extends ground through make contact 14LK2–1 via the SM lead to crossbar switch field 107 so as to operate all select magnets in crossbar field 107 associated with link control circuit 105. Referring briefly to FIG. 2, it will be noted that link control circuit 105 is associated with all horizontal levels designated SM1, each of which are multipled to the other on all switches. In order to connect trunk 109 to the link, it will be necessary to enable crosspoints 18–1 by the sequential operation of the select magnet associated with horizontal level SM1 and the hold magnet associated with vertical unit HM18.

Figure 12:
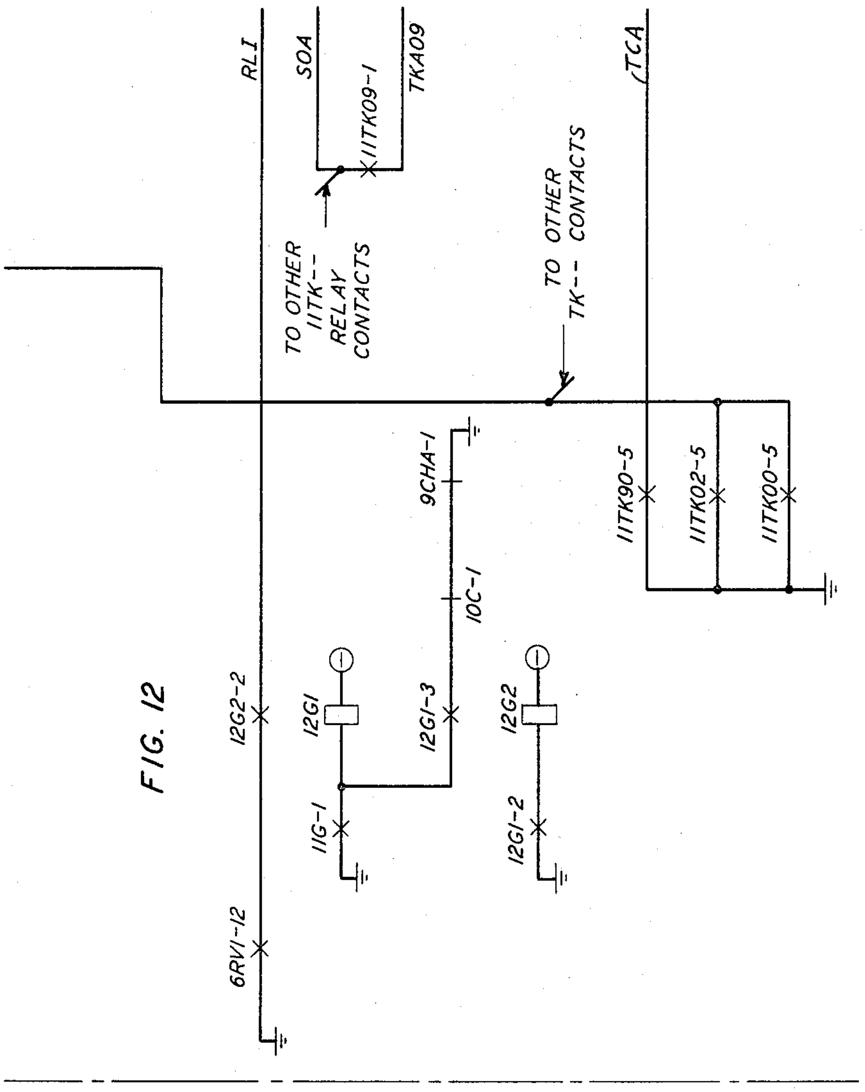
Figure 13:
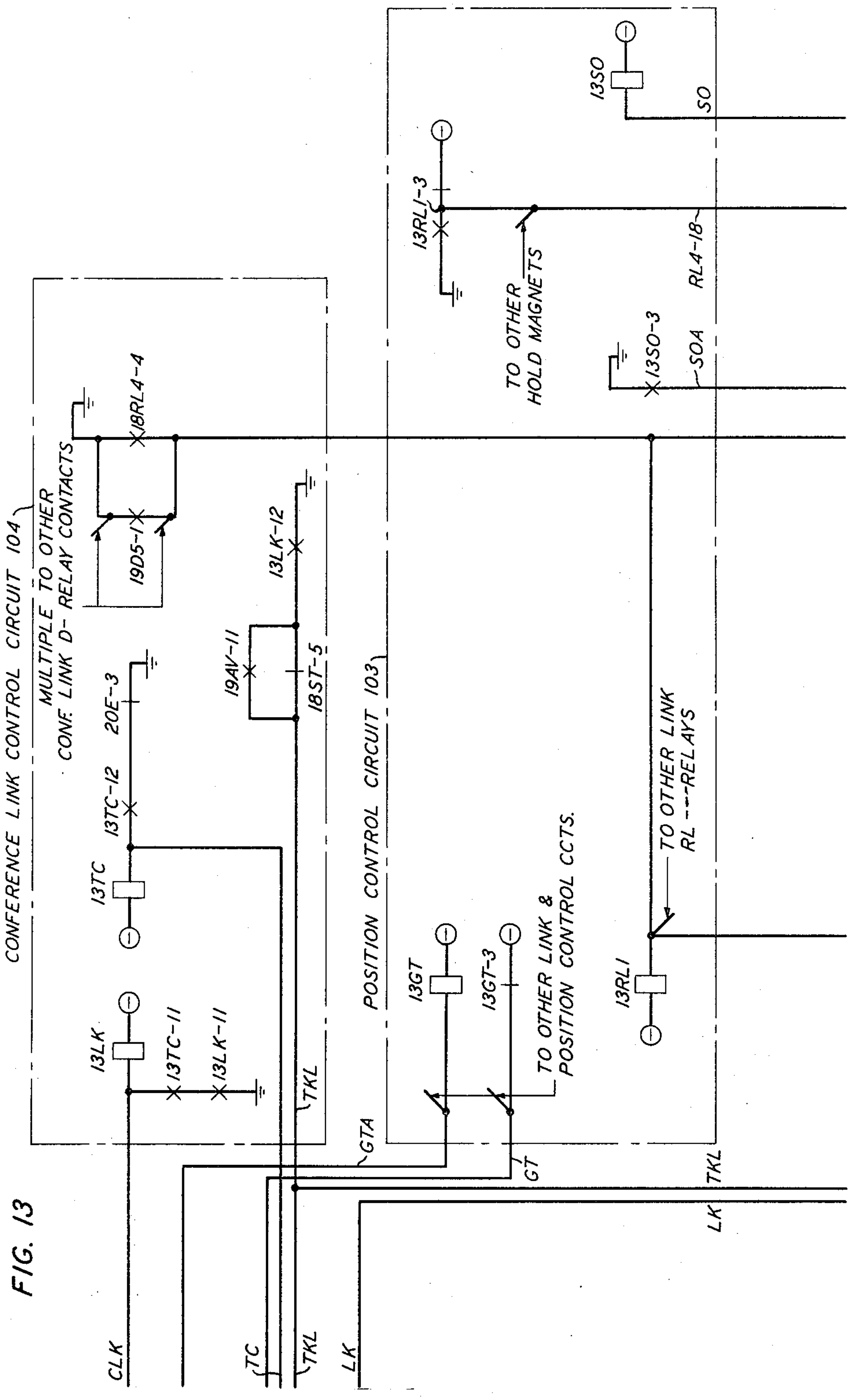

Having operated the select magnets, ground is extended from crossbar switch field 107 (FIG. 14) through enabled make contact 14SM–2 and all other select magnet contacts associated with link control circiut 105, via the S0 lead so as to operate relay 13S0 in position control circuit 103. The operation of make contact 13S0–3 extends ground via the S0A lead from position control circuit 103 (FIG. 13) through link control circuit 105 to enabled make contacts 1 of the respectively designated 11TK— relay make contacts 1. This ground is thus extended through 11TK09–1 via the TKA0–9 lead to link control circuit 105 so as to operate hold magnet 14HM18 and thence via the RLA–18 lead to negative battery on released contact 13RL1–3 in position control circuit 103. Referring now to FIG. 12, in similar fashion although not shown in detail herein, ground on the S0A lead is also extended through enabled make contact 11TK00–1 so as to operate the hold magnet associated with trunk 110 in a manner identical to that described for hold magnet 14MH18 which is associated with trunk 109.

Referring again to FIG. 2, it will be noted that the immediately foregoing circuit action results in the closure of crosspoints 18–1 and 19–1, thereby extending a connection between trunks 109 and 110 via the horizontal multiple which extends between levels SM1 on crossbar switches 112 and 113. It is of course obvious that if additional trunk or station line circuits had been priorly selected by console 101 they, too, would be connected via their respective hold magnets to horizontal level SM1 at this time.

Crosspoint 18–1, which is identical in arrangement to crosspoint 19–1, is shown in detail on FIG. 16. Thus, it will be seen that the T and R conductor of trunk circuit 109 is extended to terminal 0 and 1 of the vertical unit HM18 via the closed crosspoints to the horizontal multiple of the crossbar switch field and thence through crosspoint 19–1 in similar fashion to trunk 110.

As hereinbefore described, the T and R conductors of the trunk constitute the talking path between calling and called parties. Therefore, at this point a complete voice connection exists between trunk 109 and trunk 110. Accordingly, voice conversation may ensue between the parties. Marginal relay 16SV operates at this time via terminal 2 of crosspoint 18–1 in series with the 17S relay of trunk circuit 109 and the correspondingly designated relay of trunk 110 which are effectively in parallel by virtue of their common junction point at crosspoint 18–1. Link lamp 1 at console 101 (FIG. 15) is lighted at this time by ground extended over the LP1 lead from enabled make contact 16SV–2 in link control circuit 105 (FIG. 16), thereby indicating the busy status of the link control circuit associated with key link 1.

Figure 14:
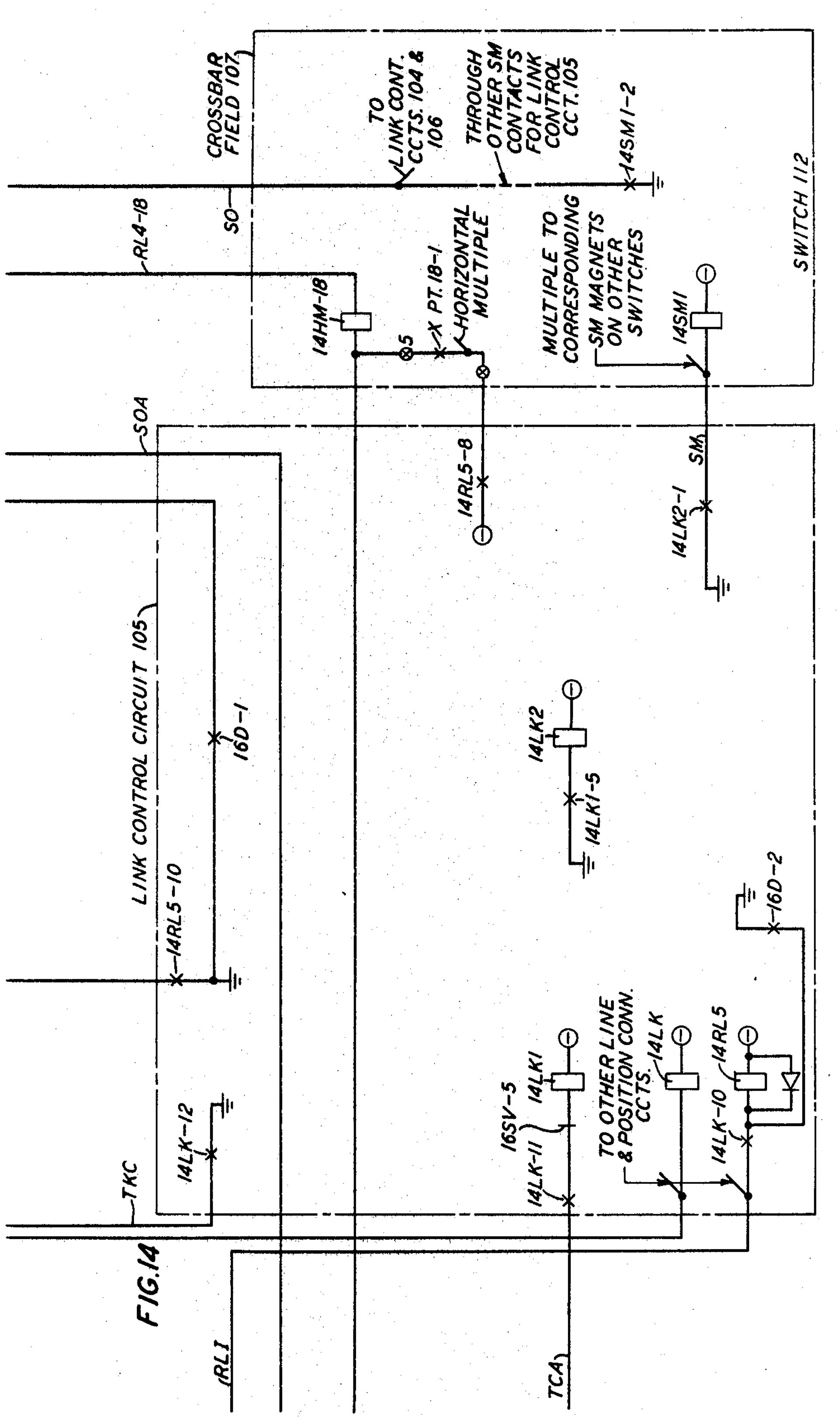

Referring now to FIG. 14, enabled break contact 16SV–5 releases relay 14LK1 at this time therefore causing the release of relay 14LK2, all select magnets associated with link control circuit 105 such as 14SM1, thus releasing relay 13S0 in position control circuit 103. Accordingly, the aforedescribed operate path of the hold magnets associated with crosspoints 18–1 and 19–1 are open at this time. However, the hold magnets may advantageously be arranged, as well known in the art, to be magnetically latching, thereby obviating the requirement for a locking circuit. The aforedescribed operation of the hold magnets associated with trunk circuits 109 and 110 cause the release of the 11TK0 and the 11TK09 relays via respectively enabled break contacts associated by an obvious circuit.

The release of key link 1 releases relay 11CR1. The release of make contact 11CR1–3 opens the previously described operate path of relay 11G releasing relay 11G at this time. The release of relay 11G operates relay 10C by an obvious circuit. The operation of relay 10C releases relays 9CH2, 8LC, and relays 8L00 and 8L09 as hereinbefore described.

The release of key link 1 also releases relay 14LK thereby releasing its correspondingly designated make contacts numbered 8 and 9 (FIG. 16) which are associated with the T and R conductors to console 101, thus releasing the console from voice connection with the calling and called parties via link control 105.

At this time both trunk lamps 00 and 09 and link lamp 1 remain lighted, by previously described circuits, as an indication of the busy condition of the associated trunks and link circuit.

2.05 *Abandonment of connection by either of two interconnected trunks*

Referring now to FIGS. 16 and 17, the release of the connection by the calling party connected through trunk circuit 109 results in the impression of ground potential on lead LS to crossbar switch field 107 through circuitry well known in the art which need not be described herein in detail. This ground signal is extended through terminal 3 of crosspoint 18–1 to cause the operation of relay 16D. Relay 14RL5 thereupon operates through enabled make contact 16D–2 to ground. Concurrently therewith ground is extended through enabled make contact 16D–1 to operate relay 13RL1 in position control circuit 103. The enabling of transfer contact 13RL1–3, FIG. 13, in position control circuit 103 extends ground to all hold magnets and then over the RLA–18 lead through hold magnet 14HM18, via terminal 5 of crosspoint 18–1 through enabled make contact 14RL5–8 to negative battery in link control circuit 105.

It will be noted that the polarity of the potential applied to hold magnet 14HM18 at this time is in opposition to that which was originally applied to cause magnetic latching of the hold magnets. Accordingly, the resulting reverse direction of current flow causes the release of the hold magnets in the well known manner. The release of hold magnets opens the associated crosspoints 18–1 and 19–1 thereby restoring the link circuit to normal.

2.06 *Monitoring on established link connections*

As hereinbefore discussed, the attendant may subsequently return to an existing link connection and monitor or challenge the connection at his discretion. This is accomplished by depressing key link 1 for example, so as to cause the reoperation of relay 14LK, relay 11CR1, and relay 11G as hereinbefore described. Accordingly as shown in FIG. 16, the enabling of make contacts 11GT4 and 11GT5; 14LKT9 and 14LKT8; and 11LK1–2 and 14LK1–1 extend the T and R conductors from the console telephone circuit through repeat coil 161 to terminals 1 and 2 of crosspoint 18–1 and thus across the existing voice communication path between the trunks as hereinbefore described. The attendant may continue to monitor the connection as long as key link 1 is maintained in a depressed condition. The release key kind 1 restores the circuitry to normal as hereinbefore described.

2.07 *Release of link by attendant*

Figure 6:
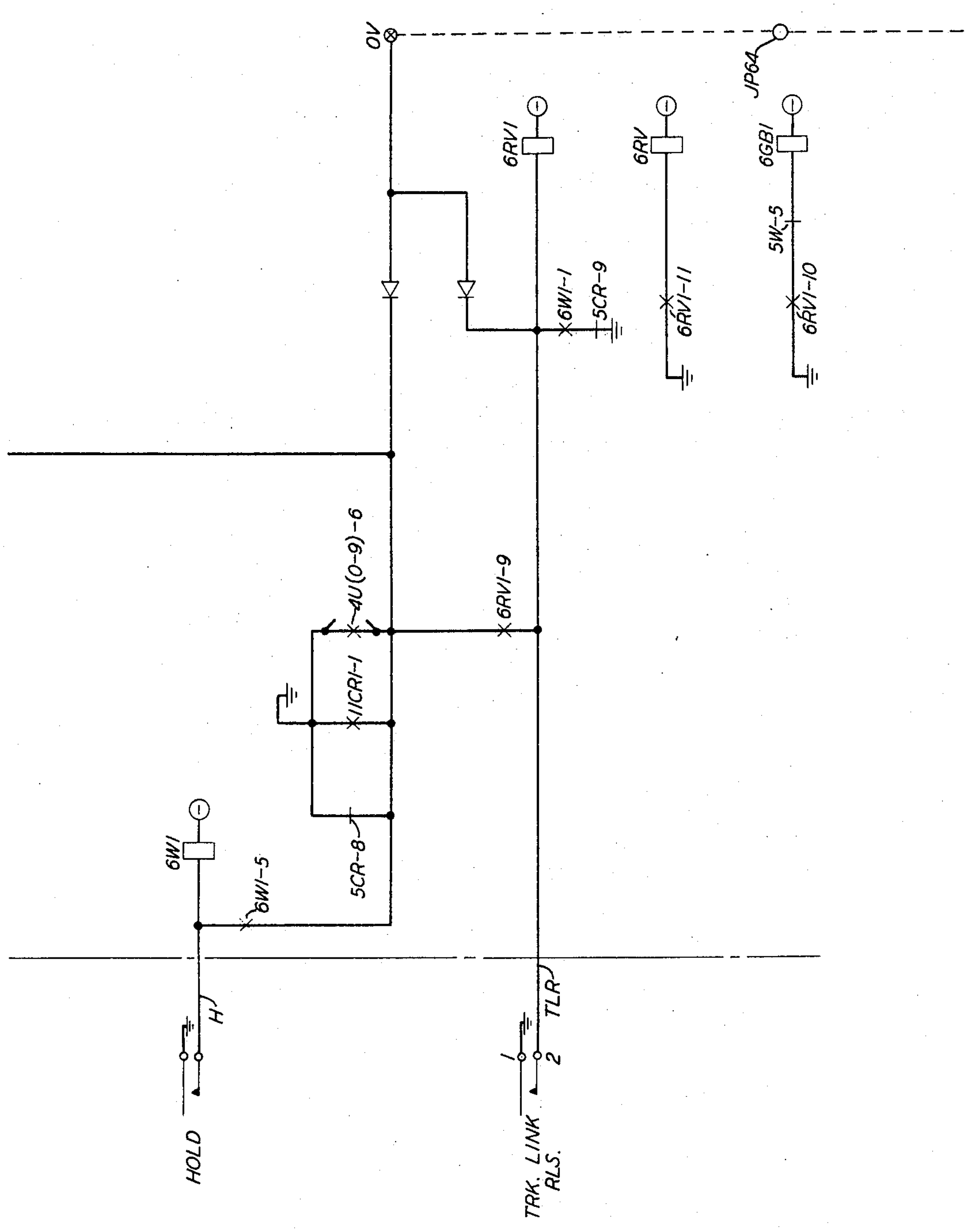

Referring now to FIG. 6, the enabling of TRK–LK RLS key completes the operate path of 6RV1 by an obvious circuit. Relay 6RV1 locks operated through enabled make contact 6RV1–9 and released break contact 5CR–8 to ground.

Subsequent operation of key link 1 causes the operation of relay 12G2 and 14LK as hereinbefore described. Accordingly, ground in FIG. 12 is extended through enabled make contact 6RV1–12 and 12G2–2 over the RLI lead through enabled make contact 14LK–10 to operate relay 14RL5 in link control circuit 104 to cause the release of link control circuit 105 as hereinbefore described.

2.08 *Hold feature*

Numerous situations may arise during the course of establishing conventional link connections between calling and called parties during the course of establishing conference connections wherein it would be advantageous to place a plurality of priorly selected trunks in a hold condition. This is accomplished in the following manner.

We shall assume that the attendant has established a connection as hereinbefore set forth whereby trunks 109 and 110 are connected through to console 101. We shall further assume at this time that the attendant desires to place trunk 110 in a hold condition. Upon so deciding the attendant depresses the nonlocking hold key, FIG. 6, at console 101, thereby operating relay 6W1 which locks operated through enabled make contact 6W1–5 and released break contact 5CR–8 to ground. Relay 6RV1 thereupon operates by an obvious circuit. Enabled make contact 6RV1–10 extends ground through released break contact 5W–5 to cause the operation of relay 6GB1 which, in turn, completes the obvious relay path of relay 6RV. The attendant thereupon key pulses the designation code of trunk 110 thereby causing the operation of relays 3T0 and 4U9 as hereinbefore described. The consequent enabling of break contact 5W–5 releases relay 6GB1. Relay 5GB then operates by a path which extends through enabled transfer contact 6W1–2 and enabled make contact 5Z–8, operated make contacts 4U9–8 and 3T0–23 to ground. Relay 5W, which is part of the W–Z pulse divider hereinbefore described, releases at this time reoperating relay 6GB1 which completes the obvious relay path of 5RV2–1.

Referring now to FIG. 7, as described in detail earlier, lead BT from trunk 109 is utilized via the TG punching to cause the operation of relay 8L09 to permit the selection of trunk 109. At this time ground on the 8L09 winding is extended in what may be termed a backward direction to the L09 punching through enabled make contact 3T0–13, operated transfer contact 5RV2–1, enabled make contact 3T0–9, via the TG09 punching to the BT lead in trunk 109 and thence through enabled make contact 17A–8 to operate relay 8H1 in trunk 109 at this time.

Referring now to FIG. 17, enabled make contact 8H–1 provides continuity between the upper and lower windings of relay 17H, thereby providing a bridge through these windings across the T and R conductors to the distant central office.

Upon the release of the push button associated with the units digit of the designation code relay 5Z releases, thereby causing the release of relay 5RV2 by virtue of the disabling of transfer contact 5Z–8.

Referring again to FIG. 7, the release of break contact 5RV2–1 extends battery through enabled make contact 3T0–13 via the L09 punching and jumper 82 to one side of the winding of relay 8L09. This battery originates in FIG. 7 through enabled make contact 6GB1–2, through released break contact 5GB–12, enabled make contact 6RV–11 and through enabled make contact 4U9–4 to the aforementioned armature spring of transfer contact 5RV2–1. The impression of this battery potential on the left side of relay 8L09 causes the shunt release of this relay in the well known fashion, the release of relay 8L09 opens the voice communication and signaling path which extends through operated make contacts of that relay as shown on FIG. 15 and discussed in detail hereinbefore. Accordingly, at this time trunk circuit 109 is placed in a hold condition disassociated from console 101.

Referring now to FIG. 17, the aforedescribed operation of relay 8H1 enabled make contact 8H1–1, thereby preparing the operate path of relay 17H2 effective upon the release of relay 17A. Relay 17A releases upon the opening of the signaling and talking path between console 101 and trunk 109 as hereinbefore described. Relay 17H2 thereupon locks operated through enabled make contact 17H2–8 to record that trunk circuit 109 has been placed in a hold condition and has been disconnected from the console. It will be noted at this time that relay 8H1 remains in an operated condition by ground which extends through the 17A–6 released break contact. Upon the subsequent reselection of trunk circuit 109 relay 17A operates as hereinbefore described, thereby releasing relay 8H1 which, in turn, interrupts the continuity priorly existing between the upper and lower windings of relay 17H through enabled make contact 8H–1, thereby removing the bridge previously existing toward the distant central office.

During the interval that trunk 109 is in a hold condition console 101 remains connected through to trunk circuit 110 via enabled make contacts on relay 8L00 as hereinbefore described. By following the procedure above set forth, trunk circuit 110 and other trunk circuits subsequently selected by the console may be placed in a hold condition disassociated from the console but available for recall as hereinbefore set forth.

2.08 *Override*

As discussed in detail hereinbefore a trunk circuit such as trunk 109 becomes unavailable for selection by another console when selected previously by a first console. This is made possible by the absence of ground on the trunk BT lead through the operation of break contact 17A–8 (trunk circuit 109, FIG. 8). However, certain conditions may arise where, although the trunk has been selected, an associated console should also be permitted to select the trunk. This is accomplished by the attendant key pulsing a predetermined override code which may advantageously be the digits 91 and, following this by dialing the trunk designation code of the trunk which is to be selected.

Referring now to FIG. 7, it will be noted that the TG91 punching has ground potential strapped thereto. Upon the operation of relays 3T9 and 4U1 from the depression of pushbutton keys 9 and 1 as hereinbefore described this ground potential is extended through the network of FIG. 7 to punching L91 which is strapped to punching 0V in FIG. 6 by jumper JP64. This ground thereupon causes the operation of relays 6RV1 and 5GB by an obvious circuit. The enabling of make contact 6RV1–11 thereupon operates relay 6RV also by an obvious circuit.

Referring again to FIG. 7, it will be seen that enabled make contact 5GB–12 and enabled make contacts 6RV–1 through 6RV–11 extend ground potential to released make contacts numbered 4 of the 4U0 through 49 relays. Therefore, upon the subsequent keying of trunk code 09, this ground is extended through enabled make contact 6U0–4 through released break contact 5RV2–3, enabled make contact 3T0–19 and via the L00 punching in the line position connector circuit associated with the override position so as to permit operation of the 8L00 relay in that circuit in a manner identical to that described for console 101 and line position connector circuit 102.

Referring momentarily to FIG. 15, it will be noted that the overriding console and the overridden console will essentially be bridged at the multiple of all corresponding 8L— relays from each position. Therefore, voice communication may ensue between all parties to the connection, namely the overriding console, the overridden console and the overridden trunk.

2.09 *Privacy feature*

As discussed hereinbefore, at certain times it may be advantageous for the dispatch attendant to be in voice communication only with the most recently selected trunk. This situation readily arises, of course, where privacy is desired. It is also desirable, as is apparent from the preceding detailed description, in that prior to connection to a link or conference circuit such selected trunks are bridged at a common point, thereby resulting in undesired transmission loses in certain cases.

In order to activate the privacy feature, the attendant enables the locking key designated "SPLIT" (FIG. 15). Referring momentarily to FIG. 17, as discussed hereinbefore, the selection of a trunk, such as trunk 109, results in the operation of relay 17A. During the course of selecting the trunk as hereinbefore described, ground is extended to the trunk circuit so as to operate relay 17A1 (or its counterpart in another trunk), which thereupon locks operated through enabled make contacts 17A1–6 and 17A–4 to ground. As will be noted from an inspection of FIG. 17, the consequent enabling of break contacts 17A1–10 and 17A1–8 opens the T and R conductors at one point in their extension console 101 to trunk 109. It will also be noted that released break contacts 17S–10 and 17S–8 maintain the continuity of the aforesaid T and R conductors thus providing a voice path as hereinbefore described between the console and the selected trunk. However, upon the operation of the "SPLIT" key in FIG. 17, battery is extended through the 9CH–8 released break contact in line and position connector circuit 102 to the multiple point of the 8L— relay contacts. It is obvious that the extension of this battery potential through enabled make contacts, such as 8L09–3, which are representative of priorly selected trunks results in the operation of relay 17S in the associated trunk circuit. As hereinbefore indicated, the enabling of break contacts 17S–10 and 17S–8 interrupt the continuity of the voice communication path between the console and the selected trunk.

However, as noted hereinbefore, relay 17A1 (or its counterpart) does not operate until the completion of trunk selection. Therefore, in a newly selected trunk, the operate path of the 17S relay is not continuous by virtue of the released condition of make contact 17A1–11. Accordingly, although the voice communcation path of priorly selected trunks is inhibited, the voice communication path to the most recently selected trunk is enabled.

The restoration of the "SPLIT" key to normal negates the privacy feature and permits simultaneous conversation with all parties by removal of the inhibiting battery signal to the trunk circuits as will be apparent by an inspection of FIGS. 15, 16 and 17.

2.10 *Establishing a conference under console control*

In order to facilitate explanation of the manner in which a conference is established between various stations and trunks served by the console, we shall assume that an incoming call via trunk 109 as hereinbefore described has resulted in a request that stations served by station line circuit 108 and trunk 110 be added to the connection in conference fashion.

The manner in which the dispatch attendant causes the selection of the aforesaid station line circuit and trunks is accomplished exactly as hereinbefore set forth in detail. While the following description will pertain to the manner in which three parties are interconnected on a conference basis, it is to be noted that the conference link control circuit 104 is arranged to service as many as five parties and could, in fact, service a greater number by an obvious extension of the principles as hereinafter set forth.

Having selected the three circuits in question the attendant momentarily operates the key designated "CONF LINK." Referring now to FIG. 11, the operation of the "CONF LINK" key extends ground over the G2 lead to line and position connector circuit 102 so as to cause the operation of control relays such as relay 11CR1, 11G and others as hereinbefore set forth. In addition, ground extended via the CLK lead causes the operation of relay 13LK in conference link control circuit 104. The subsequent operation of make contacts numbered 5 on the 11TK00, 11TK02 and 11TK90 relays, FIG. 12, as hereinbefore described extends ground via the TC lead so as to cause the operation of relay 13TC in conference link control circuit 104.

Figure 18:
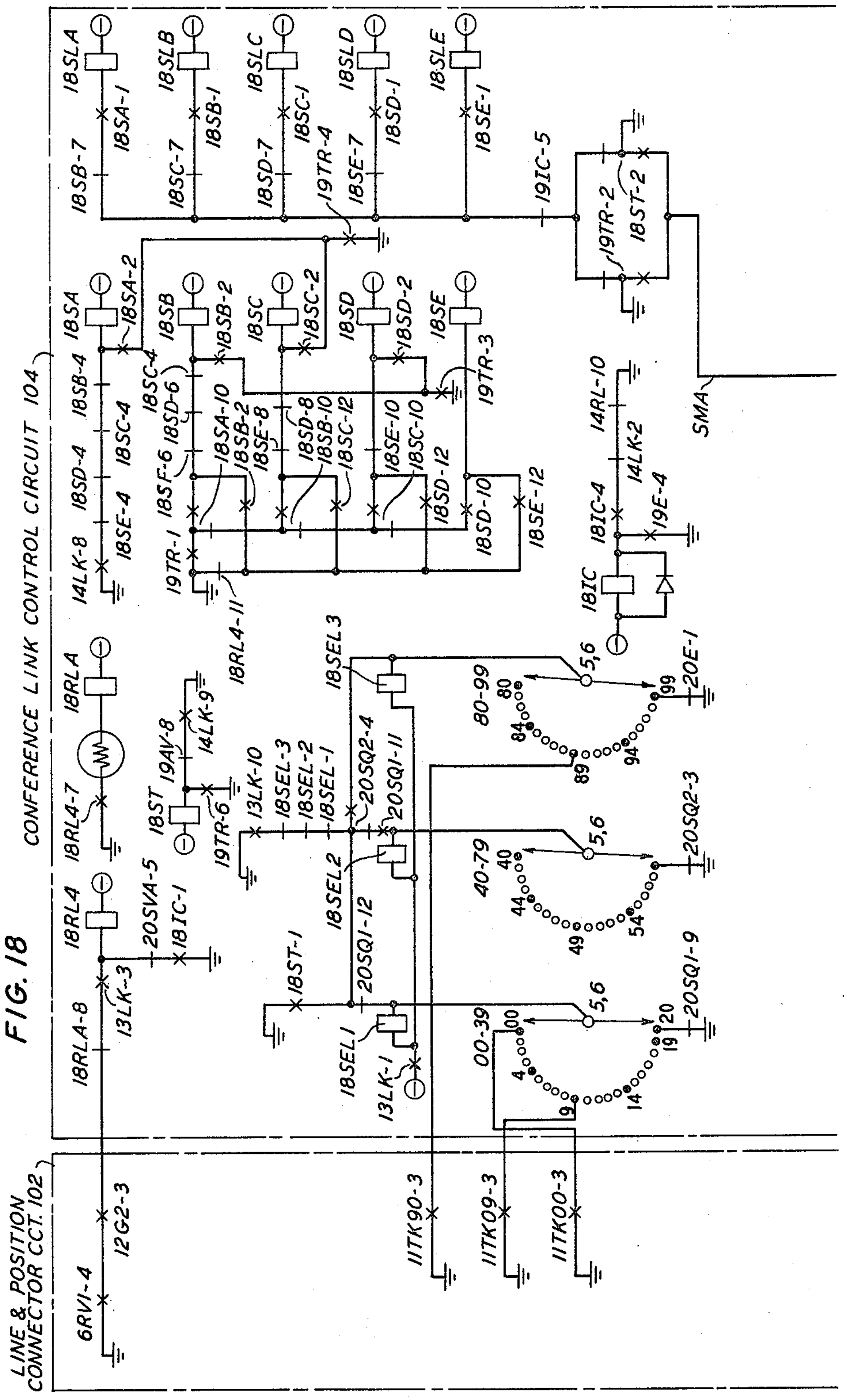

Referring now to FIG. 18, relay 18ST operates by an obvious circuit which extends through enabled make contact 14LK–9. Relay 18SEL1 also operates at this time by negative battery extending through enabled make contact 13LK–1, the 13SEL1 winding, released break contact 20SQ–12 and enabled make contact 18ST–1 to ground.

Figure 19:
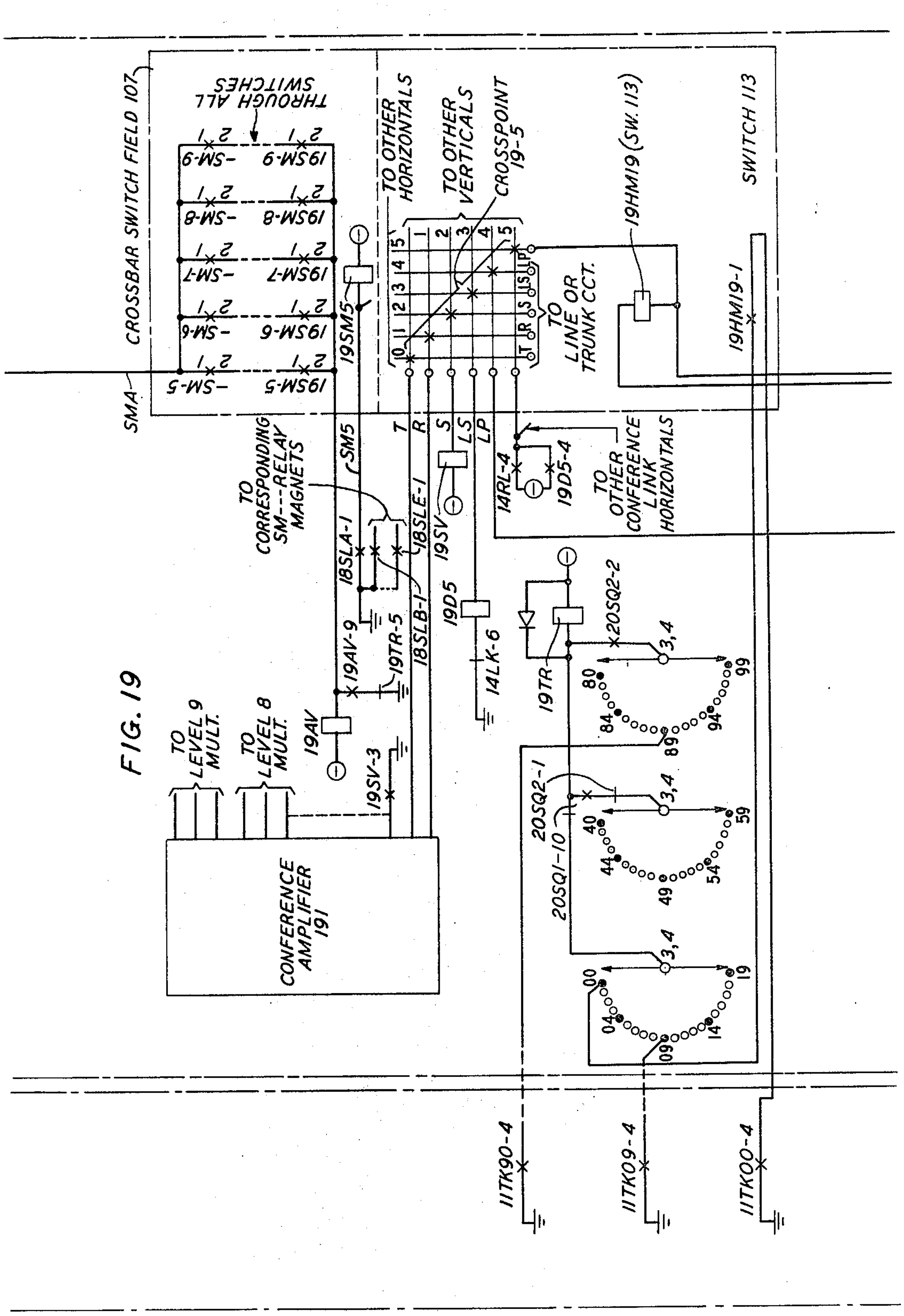
Figure 20:
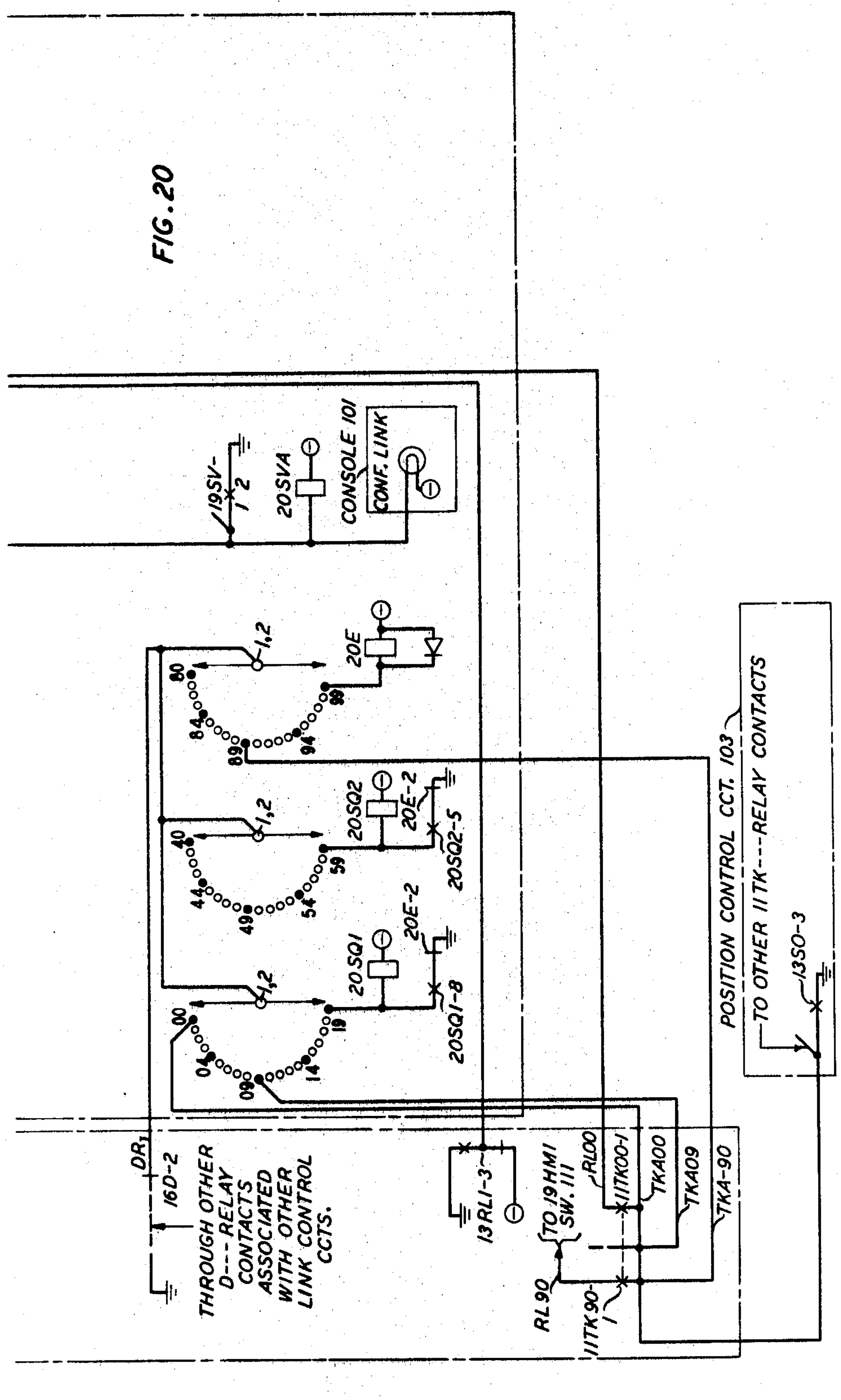

Digressing momentarily, it will be noted that selector magnet 18SEL1 controls the stepping of a selector switch of the well-known type which is portrayed as three banks of terminals directly beneath the 18SEL magnet on FIGS. 18, 19 and 20. It will also be noted that selector magnets 18SEL2 and 18SEL3 are similarly shown in the drawing. Selector magnet 18SEL1 may be of the type well known in the art, such that it controls a back-acting switch; namely, the energization of the selector magnet results in the preparing of the brushes for rotation. The subsequent de-energization of the selector magnet thereupon causes the actual "stepping" of the switch.

Proceeding now with the description, the enabling of make contact 14LK–8 completes the obvious operate path of relay 18SA. Relay 18SLA thereupon operates from the closure of enabled make contact 18SA–1 by an obvious circuit. Referring now to FIG. 19, enabled make contact 18SLA–1 extends ground via the SM5 lead to crossbar switch field 107 so as to enable all select magnets, such as select magnet 19SM5, associated with level 5 on all switches. Relay 19AV thereupon operates by ground which is extended from FIG. 18 via enabled make contact 18ST–2, the SMA lead, through operated off-normal contacts of all select magnets corresponding to level 5 on the crossbar switches, and thence to the winding of the 19AV relay. Relay 19AV accordingly operates and locks operated through enabled make contact 19AV–9, and released break contact 19TR–5 to ground. The enabling of break contact 19AV–8 opens the operate path of relay 18ST. The release of make contact 18ST–1 de-energizes selector magnet 18SEL1 thereby permitting the associated wipers 1, 2, 3, 4, and 5 to step across the terminal banks shown in FIGS. 18, 19 and 20.

As discussed hereinbefore, a selected trunk 110 results in the operation of relay 11TK00 in line and position connector circuit 102. Accordingly, ground present on make contact 3 of that relay is extended to the 00 terminal of the selector bank as shown in FIG. 18. This ground is therefore extended via wiper arm 5 to cause the energization of selector magnet 18SEL1, thereby causing the cessation of stepping in the well-known manner. Referring now to FIG. 20, ground is extended from line and position connector circuit 102 through a chain of released break contacts on the D relays associated with other link control circuits, via the DR lead to conference link control circuit 104, and thence through wiper arm 1, via terminal 00, through enabled make contact 11TK00–1, via the RL00 lead to crossbar switch field 107, through the winding of hold magnet HM19, and finally to battery present on released break contact 13RL1–3 in line and position connector circuit 102. Hold magnet 19HM19 accordingly operates at this time.

Referring momentarily to FIG. 2, it will be noted that the aforedescribed operation of the selector magnet associated with horizontal level SM5 on switch 113, and the subsequent operation of hold magnet 19HM19 which controls vertical unit HM19 on the same switch, results in the closure of a crosspoint designated 19–5, thereby extending the leads from trunk circuit 110 through crosspoint 19–5 to an independent input path to link control circuit 104. Returning now to FIG. 19, where crosspoint 19–5 is shown in more detail, it will be noted that the LS and LP leads control apparatus similar in arrangement and function to that hereinbefore described for link control circuit 105. It will also be noted that the T and R conductors are extended to conference amplifier 191 which may comprise a number of configurations well known in the art sufficient to provide the necessary amplification and equalization required for a plurality of stations involved in a conference connection.

The operation hold magnet 19HM19 enables its make contact numbered 1 so as to complete an obvious path which extends through wiper blade 3 on selector 18SEL1 to cause the operation of relay 19TR at this time. The enabling of make contact 19TR–1 extends ground through enabled make contact 18SA–10 so as to cause the operation of relay 18SB at this time. The operation of relay 18SB opens the previously described operate path of relay 18SLA and completes an obvious circuit for enabling relay 18SLB at this time. Referring now to FIG. 19, the enabling of make contact 18SLB–1 extends ground to the next highest horizontal level associated with conference link control circuit 104. This obviously would be horizontal level SM6. However, as hereinbefore described, in order to simplify the drawings, only conference link control horizontal levels 5, 8 and 9 have been shown. Accordingly, we shall assume that the select magnets associated with horizontal level SM8 are enabled at this time. The aforedescribed operation of relay 19TR caused the release of relay 19AV by an obvious circuit. However, a subsequent enabling of the select magnets associated with horizontal level SM8 results in the reoperation of relay 19AV which again opens the operate path of relay 18ST causing its release.

As hereinbefore described in detail, the operation of the hold magnet associated with trunk 110 caused the release of the 11TK00 relay thus removing the ground potential present on the wiper arm 5 of selector switch 18SEL1. Accordingly, selector magnet 18SEL1 continues to step until it reaches terminal 9 which is associated with trunk 109 via the 11TK09 relay whereupon the aforedescribed operation of the corresponding hold magnet is again repeated. Upon the recycling of the conference link control circuit 104 at the completion of the closure of crosspoints 18–8 which is associated with trunk 109, FIG. 2, selector magnet 18SEL1 is again activated. Since we have assumed that the only remaining trunk to be added to the conference connection is that which is manifested by station line circuit 108, it is obvious that selector magnet 18SEL1 will step to the point where the obvious operate path of relay 20SQ1 is completed via wiper blade 1. The enabling of breaker contact 20SQ1–12 inhibits the subsequent-operation of selector magnet 18SEL1 at this time. Thus selector magnet 18SEL2 is enabled in a manner similar to that described for SEL1 and it, too, scans all trunks in a numerically ascending order until the operation of relay 20SQ2 transfers the selector magnet activation to relay 18SEL3 by an obvious circuit. At this point selector magnet 18SEL3 causes the rotation of wiper arm 5 until the lead associated with enabled make contact 11TK90–3 is encountered on the terminal bank. Then, in similar fashion to that hereinbefore described, relay 18SEL3 ceases stepping of the wiper blades with the resulting enabling of crosspoint 1–9 in crossbar switch field 107, thereby extending the voice communication path from station line circuit 108 to conference amplifier 191 of FIG. 19. The consequent release of the make contacts numbered 5 on the 11TK00, 11TK02 and 11TK90 relays removes the ground potential from the TC lead (FIGS. 11 and 12) to conference link control circuit 104 thus allowing 18SEL3 to step until relay 20E operates via an obvious circuit. Accordingly, enabled break contact 20E–3 releases relay 13TC and relay 13LK, thereby restoring conference link control circuit 104 to normal. At this time the ground extended over the aforedescribed LP lead from the connected trunks causes the lighting of the conference link lamp at console 101 as shown on FIG. 20. As each connected trunk sends its disconnect signal over the LS lead, the associated D relay such as 19D5 operates, thereby causing the release of the associated hold magnet as hereinbefore described. When the last trunk has disconnected, relay 20SVA releases by virtue of the absence of ground potential on the LP lead, and the link and trunk lamps are restored to their darkened condition indicating the reavailability of the associated circuits.

2.11 *Adding an additional party to an established conference connection*

Situations may arise where one or more parties are unavailable at the time a conference connection is established. When this occurs, such parties may be subsequently added to the priorly established conference connection as set forth in the following.

As described in the immediately preceding section, upon the establishment of the conference connection, relays 13LK and 13TC release, thereby restoring conference link control circuit 104 to normal. As discussed in detail therein, relays 18SLA through 18SLE control the operation of the select magnets associated with conference link control circuit 104. Referring now to FIG. 18, we shall assume that only four of the five conference levels have been utilized, namely those controlled by relays 18SLA, 18SLB, 18SLC, and 18SLD. This fact is recorded by the operated condition of relays 18SE and 18SLE. The control path of relay 18SE extends through operated make contact 12 of relay 18SE and released break contact 11 of relay 18RL4 to ground. The control path of relay 18SLE extends through enabled make contact 18SLE–1, operated make contact 13TC–9, and released break contacts 18IC–5 and 19TR–2 to ground. Thus at this point ground is extended via enabled make contact 18SLE–1 to the corresponding select magnet in switch field 107 (FIG. 19).

To add the additional party, the attendant key pulses the designation code as hereinbefore described to cause selection of the trunk or station by the console. To add the party to the conference the attendant depresses the "end" key (FIGS. 2 and 10) at console 101 and thereafter depresses the CONF link key. As will be apparent hereinafter, the apparatus associated with the "end" key obviates the possibility that a single station or trunk would be inadvertently placed alone on a link.

Proceeding now with the description, and referring to FIG. 10, the enabling of the end key completes the partially prepared operate path of relay 10CH1, as hereinbefore described, which thereupon operates. The enabling of break contact 10CH1–1 releases relays 9CH and 9CHA in sequence. Accordingly, in response to the operation of the conference link key, ground is extended from released break contact 9CHA–12 to operate the appropriate TK— relay as hereinbefore described. As also described in detail hereinbefore, conference link control circuit 104 is enabled. However, the operated state of relays 18SE and 18SLE in conjunction with the subsequently operated hold magnet result in the closure of a crosspoint associated with the last idle horizontal.

Upon the completion of this latter connection, conference link control circuit 104 restores to normal as hereinbefore described. It will be noted that, if desired, additional trunks may be added to the conference in multiple to the horizontal level associated with relay 18SLE by proceeding as above described since ths relay remains operated upon the restoration of conference link control circuit 104.

CONCLUSION

While the equipment of my invention has been described with reference to a particular embodiment in a dispatch switching system, it is to be understood that such an embodiment is intended merely to be illustrative, and that numerous other arrangements may be devised by those skilled in the art without departing from the spirit and scope of the invention.

For example, the invention may be employed in conjunction with conventional attendant consoles or switchboards which are associated with numerous other type of manual or automatic switching systems.

What is claimed is:

1. In a telephone system;
a plurality of trunks,
an attendant console comprising a plurality of status indicating lamps positionally arranged in a numerically ordered matrix wherein each of said lamps is exclusively associated with one of said trunks,
selectively operable means,
a pushbutton set for generating a code corresponding to the coordinate location of one of said lamps in said matrix,
control means responsive to the reception of said code for connecting said console to the trunk associated with said lamp, and
means responsive to the establishment of another of said connections and the momentary activation of said selectively operable means for interconnecting the trunks associated with said connections and for concurrently releasing said console.

2. The combination set forth in claim 1 further comprising means responsive to the reactivation of said selectively operable means for an arbitrary interval of time for reconnecting said trunks to said console during said interval.

3. The combination set forth in claim 1 further comprising additional selectively operable means, and
means responsive to the activation of said additional selectively operable means for releasing said interconnecting means.

4. In a telephone system;
a plurality of trunks each comprising hold means for maintaining a priorly established connection,
an attendant console comprising a plurality of status indicating lamps positionally arranged in a numerically ordered matrix wherein each of said lamps is exclusively associated with one of said trunks,
a pushbutton set for generating a plurality of codes each corresponding to the coordinate location of certain of said lamps in said matrix,
selectively operable means,
control means responsive to the reception of said codes for connecting said console with the trunks associated with said certain lamps, and
means responsive to the activation of said selectively operable means and the subsequent regeneration of any of said codes for enabling the said hold means in each of the respectively associated trunks.

5. The combination set forth in claim 4 further comprising means responsive to the said enabling of each of said hold means for disconnecting the associated trunk from said console.

6. The combination set forth in claim 5 further comprising means responsive to the regeneration of one of said codes for disabling the hold means in the associated trunk and for concurrently reconnecting said trunk to said console.

7. In a telephone system:
a plurality of trunks,
a conference network,
an attendant console comprising a plurality of status indicating lamps positionally arranged in a numerically ordered matrix wherein each of said lamps is exclusively associated with one of said trunks,
a pushbutton set for generating codes in arbitrary sequence each corresponding to the coordinate location of certain of said lamps in said matrix,
selectively operable means,
control means responsive to the reception of said codes for connecting said console to the corresponding trunks associated with said certain lamps, and
conference means responsive to the activation of said selectively operable means for independently connecting each of said corresponding trunks in ascending numerical order to the said conference network and for thereupon disconnecting said corresponding trunks from said console.

8. The combination set forth in claim 7 further comprising means responsive to the reception of additional codes and the subsequent reactivation of said selectively operable means for independently connecting the trunks associated with said additional codes to said conference network.

9. The combination set forth in claim 7 further comprising other operable means, and means responsive to the reception of another said code and the sequential activation of said other operable means and said selectively operable means for connecting the trunk associated with said other code to said conference network.

10. In a telephone system:
a plurality of trunks,
an attendant console comprising a plurality of status indicating lamps positionally arranged in a numerically ordered matrix wherein each of said lamps is exclusively associated with one of said trunks,
a pushbutton set for generating a plurality of codes each corresponding to the coordinate location of certain of said lamps in said matrix,
selectively operable means,
control means responsive to the reception of each of said codes for sequentially connecting said console to the trunks associated with said lamps via independent voice communication paths, and
means responsive to the activation of said selectively operable means for inhibiting the said voice communication paths of all priorly connected trunks.

11. The combination set forth in claim 10 further comprising additional selectively operable means, and
means responsive to the activation of said additional selectively operable means for deactivating said inhibiting means.

12. In a telephone system:
a plurality of trunks,
an attendant console comprising a plurality of status indicating lamps positionally arranged in a numerically ordered matrix wherein each of said lamps is exclusively associated with one of said trunks,
a pushbutton set for generating a plurality of codes each corresponding to the coordinate location of certain of said lamps in said matrix,
control means responsive to the reception of said codes for connecting said console to the trunks associated with said certain lamps,
selectively operable means, and
means responsive to the activation of said selectively operable means and the subsequent regeneration of any of said codes for releasing the connection of the trunk associated with said regenerated code from said console.

13. In a telephone system:
a plurality of trunks,
an attendant console comprising a plurality of status indicating lamps positionally arranged in a numerically ordered matrix wherein each of said lamps is exclusively associated with one of said trunks,
a pushbutton set for generating a plurality of codes each corresponding to the coordinate location of certain of said lamps in said matrix, and control means responsive to the reception of said plurality of codes for interconnecting the trunks associated with said certain lamps with each other and with said console.

14. The combination set forth in claim 13 further comprising selectively operable means, and means responsive to the momentary activation of said selectively operable means for disconnecting said trunks from each other and from said console.

15. In a telephone system:

a plurality of trunks, a plurality of attendant consoles each comprising a plurality of status indicating lamps positionally arranged in a numerically ordered matrix wherein each of said lamps is exclusively associated with one of said trunks and a pushbutton set for generating a plurality of codes each corresponding to the coordinate location of certain of said lamps in said matrix, control means responsive to the reception of a plurality of said codes from a first one of said consoles for connecting said one console to the corresponding trunks associated with said certain lamps, and means for inhibiting the connection of said corresponding trunks to any other said console.

16. The combination set forth in claim 15 further comprising means responsive to the generation by any other said console of a predetermined code for disabling said connection inhibiting means.

17. The combination set forth in claim 16 further comprising means responsive to the subsequent generation by said other console of any of said codes corresponding to the coordinate location of any of said lamps for connecting said other console to the corresponding trunks associated with said certain lamps.

18. In a telephone system:

a plurality of trunks each comprising hold means for maintaining a priorly established connection and idle indicating means including a conductor for electrically manifesting the status of the trunk, an attendant console comprising a plurality of status indicating lamps positionally arranged in a numerically ordered matrix wherein each of said lamps is exclusively associated with one of said trunks, a pushbutton set for generating a code corresponding to the coordinate location of one of said lamps in said matrix, control means responsive to the reception of said code and controlled by said idle indicating means for connecting said console with the trunk associated with said lamp, selectively operable means, and means responsive to the activation of said selectively operable means and the subsequent regeneration of said code for enabling the hold means in said connection trunk via said connected trunk conductor.

19. In a switching system:

a crossbar switch field comprising vertical columns and horizontal rows wherein each of said horizontal rows is connectible to any said vertical columns, a plurality of lines each assigned a unique vertical column appearance in said switch field, a control position comprising a plurality of lamps positionally arranged in a numerically ordered matrix wherein each of said lamps is exclusively associated with one of said lines, a plurality of nonlocking keys at said position each associated with a unique horizontal row in said switch field, a signaling set at said console for generating a plurality of codes each corresponding to the positional location of one of said lamps in said matrix, control means responsive to the reception of said plurality of codes for connecting the lines associated with said codes to said position independently of said switch field, means responsive to the momentary actuation of any of said nonlocking keys for enabling the associated horizontal row in said switch field, and means responsive to the enabling of said associated horizontal row for enabling the vertical columns assigned to each of said associated lines to thereby interconnect said associated lines via said enabled horizontal row.

20. The combination set forth in claim 19 further comprising means enabled in response to the reactivation of said nonlocking key for connecting said position to said associated lines via said switch field while said key is actuated.

References Cited

UNITED STATES PATENTS

| | | | |
|---|---|---|---|
| 3,099,719 | 7/1963 | Gerbore et al. | 179—18.01 |
| 3,101,393 | 8/1963 | Desnoes et al. | 179—90.3 X |
| 3,301,962 | 1/1967 | McKelvey et al. | 179—18.01 |

KATHLEEN H. CLAFFY, *Primary Examiner.*

L. A. WRIGHT, *Assistant Examiner.*